(12) United States Patent
Takami et al.

(10) Patent No.: US 7,906,036 B2
(45) Date of Patent: Mar. 15, 2011

(54) FERRITE SINTERED MAGNET

(75) Inventors: Takashi Takami, Saitama-ken (JP); Yasunobu Ogata, Saitama-ken (JP)

(73) Assignee: Neomax Co., Ltd., Osaka (JP)

( * ) Notice: Subject to any disclaimer, the term of this patent is extended or adjusted under 35 U.S.C. 154(b) by 462 days.

(21) Appl. No.: 10/571,354

(22) PCT Filed: Sep. 13, 2004

(86) PCT No.: PCT/JP2004/013339
§ 371 (c)(1),
(2), (4) Date: Mar. 10, 2006

(87) PCT Pub. No.: WO2005/027153
PCT Pub. Date: Mar. 24, 2005

(65) Prior Publication Data
US 2006/0284136 A1  Dec. 21, 2006

(30) Foreign Application Priority Data

Sep. 12, 2003 (JP) ................................. 2003-321988
Mar. 2, 2004 (JP) ................................. 2004-058098

(51) Int. Cl.
*C04B 35/26* (2006.01)
*H01F 1/00* (2006.01)
*H01F 1/047* (2006.01)
*H01F 1/053* (2006.01)
*H01F 1/055* (2006.01)
*H01F 1/06* (2006.01)
*H01F 1/08* (2006.01)

(52) U.S. Cl. ............ 252/62.63; 252/62.51 R; 252/62.56; 252/62.57; 252/62.62

(58) Field of Classification Search .................. None
See application file for complete search history.

(56) References Cited

U.S. PATENT DOCUMENTS 6,086,781 A * 7/2000 Taguchi et al. ............ 252/62.57
6,139,766 A * 10/2000 Taguchi et al. ............ 252/62.57
6,258,290 B1   7/2001 Taguchi et al.
6,402,980 B1   6/2002 Taguchi et al.

FOREIGN PATENT DOCUMENTS

| CN | 1239578 A | 12/1999 |
|---|---|---|
| EP | 0 940 823 A1 | 9/1999 |
| EP | 0 940 824 A1 | 9/1999 |
| JP | 11-224812 | 8/1999 |

(Continued)

OTHER PUBLICATIONS

Chikazumi Soushin, Physics of Strong Magnetic Substances (First Book)—Magnetic Properties of Substances--, pp. 18-27 Published by SHOKABO Publishing Co. in 1978.

(Continued)

*Primary Examiner* — Melvin C Mayes
*Assistant Examiner* — Colin W Slifka
(74) *Attorney, Agent, or Firm* — Sughrue Mion, PLLC

(57) ABSTRACT

A sintered ferrite magnet having a basic composition represented by the general formula: $A_{1-x-y+a}Ca_{x+b}R_{y+c}Fe_{2n-z}Co_{z+d}O_{19}$ (atomic ratio), wherein a, b, c and d represent the amounts of an A element, Ca, an R element and Co added in the pulverization step of an oxide magnet material, which are numerals meeting the conditions of $0.03 \leq x \leq 0.4$, $0.1 \leq y \leq 0.6$, $0 \leq z \leq 0.4$, $4 \leq n \leq 10$, $x+y<1$, $0.03 \leq x+b \leq 0.4$, $0.1 \leq y+c \leq 0.6$, $0.1 \leq z+d \leq 0.4$, $0.50 \leq [(1-x-y+a)/(1-y+a+b)] \leq 0.97$, $1.1 \leq (y+c)/(z+d) \leq 1.8$, $1.0 \leq (y+c)/x \leq 20$, and $0.1 \leq x/(z+d) \leq 1.2$.

7 Claims, 18 Drawing Sheets

FOREIGN PATENT DOCUMENTS

| | | |
|---|---|---|
| JP | 11-224812 A | 8/1999 |
| JP | 2001-76919 A | 3/2001 |
| JP | 2002-104872 | 4/2002 |
| JP | 2002-104872 A | 4/2002 |
| JP | 2002104872 A * | 4/2002 |

OTHER PUBLICATIONS

Third Party Observation (European Communication) dated Dec. 11, 2008.

* cited by examiner

FERRITE SINTERED MAGNET

FIELD OF THE INVENTION

The present invention relates to a high-performance sintered ferrite magnet having higher intrinsic coercivity Hcj and residual magnetic flux density Br than those of conventional sintered ferrite magnets, which is extremely suitable for a wide range of applied magnet products, such as motors for automobiles or electric appliances, magnet rolls for copiers, etc.

BACKGROUND OF THE INVENTION

Sintered ferrite magnets having magnetoplumbite-type (M-type) structures are used in various applications including motors, rotors of electric generators, etc. Sintered ferrite magnets having higher magnetic properties are recently required for the purpose of reduction in size and weight of motors for automobiles and increase in efficiency of motors for electric appliances. Sintered ferrite magnets used in motors for automobiles, for instance, are required to be thin for the purpose of reduction in size and weight. That is, demand is mounting for sintered ferrite magnets having high Br, as well as such high Hcj and squareness ratio (Hk/Hcj) that their magnetization is not reduced by a demagnetization field generated when they are made thinner.

M-type sintered ferrite magnets such as Sr ferrite or Ba ferrite, etc. have conventionally been produced by the following steps. An iron oxide and a Sr or Ba carbonate, etc. are mixed and calcined to produce calcined clinker by a ferritization reaction. The calcined clinker is coarsely pulverized, and a predetermined amount of the resultant coarse powder is charged into a fine pulverizer, together with $SiO_2$, $SrCO_3$, $CaCO_3$, etc. for controlling the sintering behavior, and further $Al_2O_3$ or $Cr_2O_3$ for controlling Hcj, if necessary. Wet fine pulverization is conducted in a solvent until their average diameter becomes 0.4-1.2 µm. A slurry containing the resultant fine ferrite particles is molded under pressure while orienting the fine ferrite particles in a magnetic field. The resultant green body is dried and then sintered, and finally worked to a desired shape.

The addition of $Al_2O_3$ or $Cr_2O_3$ improves Hcj but drastically reduces Br. This phenomenon occurs because $Al^{3+}$ or $Cr^{3+}$ dissolved in the M phase acts to reduce saturation magnetization σs, and suppress grain growth during sintering.

To solve this problem, Japanese Patent 3,337,990 (corresponding to U.S. Pat. No. 6,139,766) proposes a sintered ferrite magnet comprising ferrite with a hexagonal structure as a main phase, which has a composition represented by $A_{1-x}R_x(Fe_{12-y}M_y)_zO_{19}$, wherein A is at least one element selected from the group consisting of Sr, Ba and Pb, Sr being indispensable, R is at least one element selected from the group consisting of rare earth elements including Y, La being indispensable, M is Co or Co and Zn, and x, y and z meet the conditions of $0.04 \leq x \leq 0.6$, $0.04 \leq y \leq 0.5$, and $0.7 \leq z \leq 1.2$. According to the description in Example 1 of Japanese Patent 3,337,990, this sintered ferrite magnet is produced by formulating a mixture of $Fe_2O_3$ powder, $SrCO_3$ powder, $Co_3O_4$ powder and CoO powder with $La_2O_3$ powder, and further with 0.2% by mass of $SiO_2$ powder and 0.15% by mass of $CaCO_3$ powder, and then calcining, pulverizing, and molding and sintering in a magnetic field. This production step is called "prior addition method," because La (R element) and Co (M element) are added before calcining. The resultant sintered ferrite magnet has high Hcj and Br (Sample Nos. 11-14). However, Sample Nos. 11-14 have as low squareness ratios Hk/Hcj as 77.6-84.1%. Accordingly, to meet the above requirement of further thinning, magnetic properties should be improved. In addition, it should be noted that an extremely small amount of $CaCO_3$ is added in a mixing step before calcining in Sample Nos. 11-14.

Japanese Patent 3,262,321 (corresponding to U.S. Pat. No. 6,086,781 and U.S. Pat. No. 6,258,290) discloses a method for producing a hexagonal sintered ferrite magnet having a composition comprising 1-13 atomic % of an A element (at least one element selected from the group consisting of Sr, Ba and Ca, Sr or Ba being indispensable), 0.05-10 atomic % of an R element (at least one element selected from the group consisting of rare earth elements including Y, or including Bi), 0.1-5 atomic % of an M element (Co or Co and Zn), and 80-95 atomic % of Fe, the method comprising adding compounds containing Co and/or the R element to particles comprising hexagonal ferrite containing at least the A element as a main phase, or further adding compounds containing Fe and/or the A element, and then molding and sintering. This method is called "post-adding method," because the R element and the M element are added in a pulverization step after calcining. Sintered ferrite magnets obtained by this method, however, fail to sufficiently meet the requirement of thinning, needing further improvement in magnetic properties, as is clear from Sample Nos. 1 and 2. In addition, it should be noted that an extremely small amount of $CaCO_3$ is added in a mixing step before calcining in Sample Nos. 1 and 2.

Japanese Patent 3,181,559 (corresponding to U.S. Pat. No. 6,402,980) discloses a sintered ferrite magnet comprising hexagonal ferrite as a main phase, and having a composition represented by the general formula: $Ca_{1-x}R_x(Fe_{12-y}M_y)_zO_{19}$, wherein R is at least one element selected from the group consisting of rare earth elements (including Y) and Bi, La being indispensable, M is Co and/or Ni, and x, y and z meet the conditions of $0.2 \leq x \leq 0.8$, $0.2 \leq y \leq 1.0$, and $0.5 \leq z \leq 1.2$. This sintered ferrite magnet, however, has as low Hk/Hcj as 75.9-80.6% (see Sample Nos. 21-23), failing to meet the above requirement of thinning. Also, as shown in FIGS. 15 and 16 in Japanese Patent 3,181,559, when x=0.4 or more in the composition of $Ca_xSr_{(0.4-x)}La_{0.6}Co_{0.6}Fe_{11.4}O_{19}$ (x=0, 0.2, or 0.4), the magnetic properties tend to become low. This appears to be due to the fact that the Co content is as very high as 0.6.

JP11-224812A discloses a sintered ferrite magnet having both an M-type ferrite phase and a spinel ferrite phase, the M-type ferrite phase comprising 1-13 atomic % of an A element (at least one element selected from the group consisting of Sr, Ba, Ca and Pb, Sr and/or Ca being indispensable), 0.05-10 atomic % of an R element (at least one element selected from the group consisting of rare earth elements (including Y) and Bi), 0.1-5 atomic % of an M element (bivalent metal element such as Co, Zn, Mg, Mn, Cu, etc.), and 80-95 atomic % of Fe. However, this sintered ferrite magnet has poor magnetic properties because of having both the M-type ferrite phase and the spinel ferrite phase.

DISCLOSURE OF THE INVENTION

Accordingly, an object of the present invention is to provide a high-performance sintered ferrite magnet having a high residual magnetic flux density Br, and a high intrinsic coercivity Hcj that does not decrease even if it is made thinner, and further has a high squareness ratio Hk/Hcj, if necessary.

The sintered ferrite magnet of the present invention has an M-type ferrite structure, the magnet comprising as indispensable elements an A element, which is Sr or Sr and Ba, an R element, which is at least one of rare earth elements including Y, La being indispensable, Ca, Fe and Co, and being produced through the steps of pulverization of an oxide magnet material, molding and sintering, the oxide magnet material having a basic composition represented by the following general formula (1):

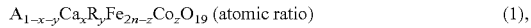

$$A_{1-x-y}Ca_xR_yFe_{2n-z}Co_zO_{19} \text{ (atomic ratio)} \quad (1),$$

and the sintered ferrite magnet having a basic composition represented by the following general formula (2):

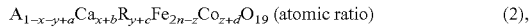

$$A_{1-x-y+a}Ca_{x+b}R_{y+c}Fe_{2n-z}Co_{z+d}O_{19} \text{ (atomic ratio)} \quad (2),$$

in the above general formulae (1) and (2), x, y, z and n representing the amounts of Ca, the R element and Co and a molar ratio in the oxide magnet material, and a, b, c and d representing the amounts of the A element, Ca, the R element and Co added to the oxide magnet material in the pulverization step, which are numerals meeting the following conditions:

$0.03 \leq x \leq 0.4$,
$0.1 \leq y \leq 0.6$,
$0 \leq z \leq 0.4$,
$4 \leq n \leq 10$,
$x+y<1$,
$0.03 \leq x+b \leq 0.4$,
$0.1 \leq y+c \leq 0.6$,
$0.1 \leq z+d \leq 0.4$,
$0.50 \leq [(1-x-y+a)/(1-y+a+b)] \leq 0.97$,
$1.1 \leq (y+c)/(z+d) \leq 1.8$,
$1.0 \leq (y+c)/x \leq 20$, and
$0.1 \leq x/(z+d) \leq 1.2$.

The oxide magnet material preferably has an M phase as a main phase, particularly the oxide magnet material is a calcined body having an M phase as a main phase.

In one embodiment of the present invention, the sintered ferrite magnet of the present invention is produced by steps comprising calcining, pulverizing, and molding and sintering after all of the A element (amount: 1−x−y, a=0) is added in the form of a compound in a mixing step before calcining (called "a method of prior-adding the A element"). To obtain high magnetic properties stably with improved sinterability, it is preferable that the A element in the form of a compound is added in an amount of (1−x−y) in a mixing step before calcining, and then in an amount of a (>0) in the pulverization step of a calcined body. This adding method is called "a method of prior/post-adding the A element."

In another embodiment of the present invention, all of Ca (amount: x, b=0) is added in the form of a compound in a mixing step before calcining, and then subjected to the production steps of calcining, pulverization, molding and sintering to produce the sintered ferrite magnet of the present invention (called "a method of prior-adding Ca"). To increase sinterability to obtain high magnetic properties stably, it is preferable that Ca in the form of a compound is added in an amount of x in a mixing step before calcining, and then in an amount of b (>0) in the pulverization step of the calcined body. This adding method is called "a method of prior/post-adding Ca."

In a further embodiment of the present invention, to obtain a sintered ferrite magnet having high magnetic properties, all of the R element (amount: y, c=0) and all of Co (amount: z, $0.1 \leq z \leq 0.4$, d=0) are preferably added each in the form of a compound in a mixing step before calcining. This adding method is called "a method of prior-adding the R element and Co."

In a further embodiment of the present invention, to obtain a sintered ferrite magnet having high magnetic properties, it is preferable that all of the R element (amount: y, c=0) and part of Co (amount: z>0) are added each in the form of a compound in a mixing step before calcining, and that the remainder of Co (amount: d>0, $0.1 \leq z+d \leq 0.4$,) is added in the form of a compound in a pulverization step after calcining. This adding method is called "a method of prior-adding the R element and prior/post-adding Co."

In a further embodiment of the present invention, to obtain a sintered ferrite magnet having high magnetic properties, it is preferable that all of the R element (amount: y, c=0) is added in the form of a compound in a mixing step before calcining, and that all of Co (amount: d, $0.1 \leq d \leq 0.4$, z=0) is added in the form of a compound in a pulverization step after calcining. This adding method is called "a method of prior-adding the R element and post-adding Co."

In a further embodiment of the present invention, to obtain a sintered ferrite magnet having high magnetic properties, it is preferable that part of the R element (amount: y) and all of Co (amount: z, $0.1 \leq z \leq 0.4$, d=0) are added each in the form of a compound in a mixing step before calcining, and that the remainder of the R element (amount: c) is added in the form of a compound in a pulverization step after calcining. This adding method is called "a method of prior/post-adding the R element and prior-adding Co."

In a further embodiment of the present invention, to obtain a sintered ferrite magnet having high magnetic properties, it is preferable that part of the R element (amount: y) and part of Co (amount: z>0) are added each in the form of a compound in a mixing step before calcining, and that the remainder of the R element (amount: c) and the remainder of Co (amount: d>0, $0.1 \leq z+d \leq 0.4$) are added each in the form of a compound in a pulverization step after calcining. This adding method is called "a method of prior/post-adding the R element and prior/post-adding Co."

In a further embodiment of the present invention, to obtain a sintered ferrite magnet having high magnetic properties, it is preferable that part of the R element (amount: y) is added in the form of a compound in a mixing step before calcining, and that the remainder of the R element (amount: c) and all of Co (amount: d, $0.1 \leq d \leq 0.4$, z=0) are added each in the form of a compound in a pulverization step after calcining. This adding method is called "a method of prior/post-adding the R element and post-adding Co."

When a d/(z+d) ratio in the prior/post-addition of Co is 0.02 or more, preferably 0.5 or more, the sintered ferrite magnet tends to have improved Br and/or Hcj, though not particularly restrictive.

BRIEF DESCRIPTION OF THE DRAWINGS

FIG. 14 is a graph showing the magnetic properties of the sintered ferrite magnet of the present invention a still further example of.

DESCRIPTION OF THE PREFERRED EMBODIMENTS

Figure 1:
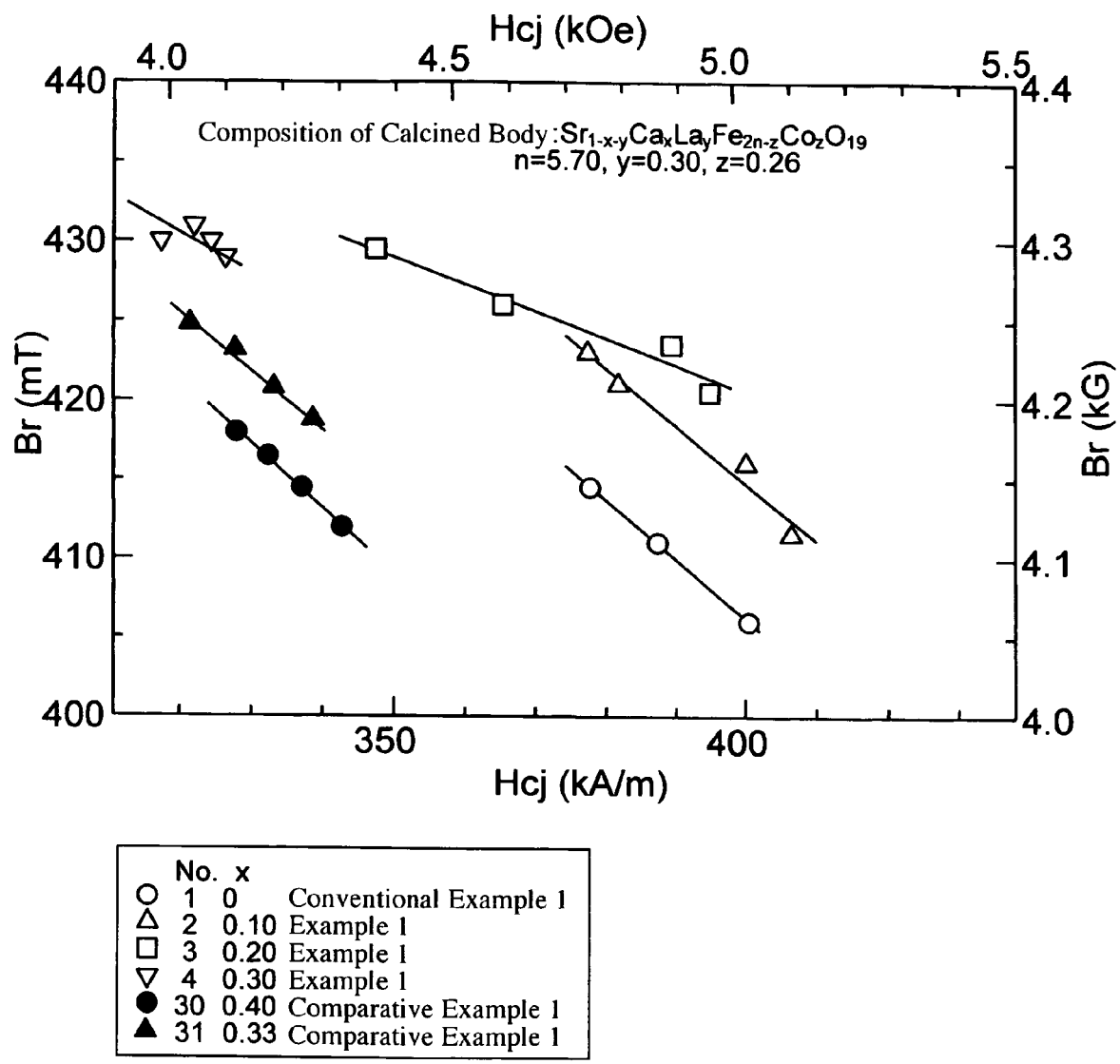
FIG. 1 is a graph showing one example of the magnetic properties of the sintered ferrite magnet of the present invention.

[1] Composition (A) Composition of Oxide Magnet Material

The oxide magnet material of the present invention comprises an A element, which is Sr or Sr and Ba, an R element, which is at least one of rare earth elements including Y, La being indispensable, Ca and Fe as indispensable elements, having a basic composition represented by the following general formula:

$$A_{1-x-y}Ca_xR_yFe_{2n-z}Co_zO_{19} \text{ (atomic ratio)},$$

wherein x, y, z and n are numerals representing the amounts of Ca, the R element and Co and a molar ratio, which meet the following conditions:
 $0.03 \leq x \leq 0.4$,
 $0.1 \leq y \leq 0.6$,
 $0 \leq z \leq 0.4$,
 $4 \leq n \leq 10$, and
 $x+y \leq 1$.

Though not particularly restricted, the conditions of $0.55 \leq [(1-x-y)/(1-y)] \leq 0.97$, and $1.0 \leq y/x \leq 20$ are preferably met to provide the sintered ferrite magnet with good magnetic properties. When the oxide magnet material contains Co, the conditions of $0<z \leq 0.4$; $0.1 \leq x/z \leq 1.2$, and $1.01 \leq y/z \leq 1.8$ are preferably met to provide the sintered ferrite magnet with good magnetic properties.

To provide the sintered ferrite magnet with good magnetic properties, the Ca content (x) in the oxide magnet material is preferably 0.03-0.4, more preferably 0.05-0.3. When x is less than 0.03, a sufficient amount of Ca is not included in the M phase, resulting in an insufficient amount of R in the M phase and thus failing to achieve an effect of improving magnetic properties. When x exceeds 0.4, the amount of the unreacted CaO increases, resulting in generating undesirable phases such as $\alpha\text{-Fe}_2\text{O}_3$ (hematite), etc.

To provide the sintered ferrite magnet with good magnetic properties, the R content (y) in the oxide magnet material is preferably 0.1-0.6, more preferably 0.15-0.5, particularly 0.2-0.4. When y is less than 0.1, an insufficient amount of R is included in the M phase, resulting in the generation of undesirable phases such as $\alpha\text{-Fe}_2\text{O}_3$, etc. When y exceeds 0.6, the amount of the unreacted R oxide increases, resulting in the generation of undesirable phases such as $\alpha\text{-Fe}_2\text{O}_3$, etc. R is at least one of rare earth elements including Y, such as La, Nd, Pr, Ce, etc., and La is indispensable. To provide the sintered ferrite magnet with good magnetic properties, the percentage of La in R is preferably 40 atomic % or more, more preferably 50 atomic % or more, most preferably 70 atomic % or more, particularly La alone. This is because La is most dissolved in the M phase among the R element.

The Co content (z) in the oxide magnet material is preferably 0-0.4, more preferably 0.1-0.3. When z exceeds 0.4, Hcj decreases dramatically. When the oxide magnet material contains Co as an indispensable component, a Ca/Co ratio (x/z) in the oxide magnet material is preferably 0.1-1.2 to provide the sintered ferrite magnet with good magnetic properties, though not particularly restricted. Outside this range, it is difficult to obtain the basic composition of the sintered ferrite magnet of the present invention. The R/Co ratio (y/z) in the oxide magnet material is preferably 1.01-1.8. Outside this range, it is difficult to obtain the basic composition of the sintered ferrite magnet of the present invention.

The molar ratio n of the oxide magnet material is preferably 4-10, more preferably 4.6-7, most preferably 5-6. When n is outside the range of 4-10, it is difficult to provide the sintered ferrite magnet of the present invention with good magnetic properties.

When the oxide magnet material contains the A element, Ca and the R element in desired amounts, the sintered ferrite magnet has good magnetic properties. Accordingly, it is necessary to meet the condition of $1-x-y>0$, namely, $x+y \leq 1$.

The A element is Sr or Sr and Ba. To provide the sintered ferrite magnet with good magnetic properties, the percentage of Sr in A is preferably 51 atomic % or more, more preferably 70 atomic % or more, most preferably Sr alone. Though not particularly restricted, an Sr/(Sr+Ca) ratio $[(1-x-y)/(1-y)]$ in the oxide magnet material is preferably 0.55-0.97, more preferably 0.60-0.95. When $(1-x-y)/(1-y)$ is outside the range of 0.55-0.97, it is difficult to obtain the basic composition of the sintered ferrite magnet of the present invention.

Though not particularly restricted, an R/Ca ratio (y/x) in the oxide magnet material is preferably 1.0-20, more preferably 1.1-10. When y/x is outside the range of 1.0-20, it is difficult to obtain the basic composition of the sintered ferrite magnet of the present invention.

(B) Composition of Sintered Ferrite Magnet

The sintered ferrite magnet of the present invention comprising the A element, the R element, Ca, Fe and Co as indispensable elements has a basic composition represented by the general formula: $A_{1-x-y+a}Ca_{x+b}R_{y+c}Fe_{2n-z}Co_{z+d}O_{19}$ (atomic ratio), wherein a, b, c and d are numerals representing the amounts of the A element, Ca, the R element and Co added in a pulverization step, which meet the following conditions, and x, y, z and n represent the contents of the indispensable elements and a molar ratio in the oxide magnet material.

$0.03 \leq x \leq 0.4$,
$0.1 \leq y \leq 0.6$,
$0 \leq z \leq 0.4$,
$4 \leq n \leq 10$,
$x+y \leq 1$,
$0.03 \leq x+b \leq 0.4$,
$0.1 \leq y+c \leq 0.6$,
$0.1 \leq z+d \leq 0.4$,
$0.50 \leq [(1-x-y+a)/(1-y+a+b)] \leq 0.97$,
$1.1 \leq (y+c)/(z+d) \leq 1.8$,
$1.0 \leq (y+c)/x \leq 20$, and
$0.1 \leq x/(z+d) \leq 1.2$.

To provide the sintered ferrite magnet of the present invention with good magnetic properties, it is further preferable to meet the conditions of $0 \leq a \leq 0.2$, $0 \leq b \leq 0.2$, $0 \leq c \leq 0.5$, and $0 \leq d \leq 0.4$, though not particularly restricted. Namely, in the pulverization step of the sintered ferrite magnet of the present invention, the amount a of the A element is preferably 0-0.2, the amount b of Ca is preferably 0-0.2, the amount c of the R element is preferably 0-0.5, and the amount d of Co is preferably 0-0.4. The term "pulverization step" used herein means a coarse or fine pulverization step. These elements may be added in amounts exceeding the ranges, but the magnetic properties rather decrease to less than 410 mT of Br or less than 330 kA/m of Hcj in that case. Accordingly, the upper limits of a, b, c and d may be set to the amounts immediately before this phenomenon occurs.

The molar ratio n' can be determined from the formula of the basic composition of the sintered ferrite magnet of the present invention by the relation of $n'=(2n+d)/[2(1+a+b+c)]$. n' is preferably 4-6, more preferably 4.5-5.8. When n' is less than 4, non-magnetic components increase, resulting in decrease in Br. When n' exceeds 6, undesirable phases ($\alpha$-$Fe_2O_3$, etc.) other than the M phase are generated, resulting in drastic decrease in magnetic properties.

The Ca content (x+b) in the sintered ferrite magnet of the present invention is preferably 0.03-0.4, more preferably 0.05-0.3. When (x+b) is less than 0.03, the inclusion of Ca in the M phase is insufficient, resulting in insufficient inclusion of R in the M phase, thus failing to achieve an effect of improving magnetic properties. When (x+b) exceeds 0.4, unreacted CaO increases, resulting in the generation of undesirable phases such as $\alpha$-$Fe_2O_3$, etc.

The R content (y+c) in the sintered ferrite magnet of the present invention is preferably 0.1-0.6, more preferably 0.15-0.5, particularly 0.2-0.4. When (y+c) is less than 0.1, the inclusion of R in the M phase is insufficient, failing to achieve an effect of improving magnetic properties. When (y+c) exceeds 0.6, the unreacted R oxide increases, resulting in the generation of $\alpha$-$Fe_2O_3$, etc.

The Co content (z+d) in the sintered ferrite magnet of the present invention is preferably 0.1-0.4, more preferably 0.2-0.3. When (z+d) is less than 0.1, a sufficient effect of improving magnetic properties cannot be obtained. When it exceeds 0.4, Hcj drastically decreases.

$[(1-x-y+a)/(1-y+a+b)]$ representing the [Sr/(Sr+Ca)] ratio in the sintered ferrite magnet of the present invention is preferably 0.50-0.97, more preferably 0.60-0.95. Outside the above ranges, good magnetic properties cannot easily be obtained.

$[(y+c)/(z+d)]$ representing the R/Co ratio in the sintered ferrite magnet of the present invention is preferably 1.1-1.8, more preferably 1.2-1.6. Outside the above ranges, good magnetic properties cannot easily be obtained.

In the present invention, $[(y+c)/x]$ representing the ratio of the R content in the sintered ferrite magnet to the Ca content in the oxide magnet material is preferably 1.0-20, more preferably 1.1-10. Outside the above ranges, good magnetic properties cannot easily be obtained.

In the present invention, $[x/(z+d)]$ representing the ratio of the Ca content in the oxide magnet material to the Co content in the sintered ferrite magnet is preferably 0.1-1.2, more preferably 0.2-1.1. Outside the above ranges, good magnetic properties cannot easily be obtained.

Though the molar number of oxygen is shown as 19 in the basic compositions of the above oxide magnet material and sintered ferrite magnet in the present invention, this indicates a stoichiometric composition ratio at y=z, and n=6. However, the molar number of oxygen may differ depending on the valences of Fe and Co, the value of n, the type of the R element, a calcining atmosphere, and a sintering atmosphere. Accordingly, though the molar number of oxygen is shown as 19 here, it may actually be deviated from 19 to some extent.

When high Hcj is needed in the present invention, it is effective to add 0.1-3.0% by mass of $Cr_2O_3$ or $Al_2O_3$ to the basic composition of the above sintered ferrite magnet in the pulverization step, and then conduct molding and sintering. When the amount of $Cr_2O_3$ or $Al_2O_3$ added is less than 0.1% by mass, Hcj is not sufficiently improved. When it exceeds 3.0% by mass, the Br of the sintered ferrite magnet decreases drastically.

[2] Production Method (A) Production of Oxide Magnet Material

The production method of the oxide magnet material (calcined body) having the above basic composition may be a solid-phase reaction method; a liquid-phase method such as a coprecipitation method, a hydrothermal synthesis method, etc.; a glass precipitation method; a spray thermal decomposition method; and a vapor-phase method; which may be used alone or in combination. Among them, the solid-phase reaction method is practically advantageous. The oxide magnet material may be produced as coarse powder of a single composition, or a blend of two or more types of coarse powder, which are produced by coarsely pulverizing calcined bodies with different calcining conditions and/or compositions, for instance, and mixing them at arbitrary ratios, as long as it has the above basic composition. Further, for instance, return scraps of green bodies or sintered bodies can be used as the oxide magnet material. Taking the solid-phase reaction for example, the production method of the calcined ferrite will be explained in detail below.

In the solid-phase reaction method, iron oxide powder, powder containing the A element, Ca-containing powder, powder containing the R element, and if necessary, Co-containing powder are used as starting materials, and a mixture of these powders is calcined (ferritized) to produce a calcined body (usually granules or clinker). The calcination may be carried out at 1373-1623 K, for instance, for 1 second to 10 hours, particularly about 0.1-3 hours, in the air, preferably in an atmosphere having more than 0.05 atm of an oxygen partial pressure, particularly 0.1-1.0 atm of an oxygen partial pressure. The calcined body thus obtained is substantially constituted by an M phase.

Usable compounds of the R element are, for instance, oxides, hydroxides, carbonates or organic salts of the R element. From the aspect of industrial production, it is preferable to use one or more of oxides such as $La_2O_3$, hydroxides such as $La(OH)_3$, hydrated carbonates such as $La_2(CO_3)_3 \cdot 8H_2O$, and organic salts such as $La(CH_3CO_2)_3 \cdot 1.5H_2O$, $La_2(C_2$ $O_4)_3.10H_2O$, etc. The use of one or more inexpensive mixed rare earth elements (La, Nd, Pr, Ce, etc.) in the form of oxides, hydroxides, carbonates or organic salts contributes to cost reduction.

Usable as Co compounds are, for instance, oxides, hydroxides or carbonates of Co. From the aspect of industrial production, it is preferable to use one or more of oxides such as CoO and $Co_3O_4$, hydroxides such as CoOOH, $Co(OH)_2$ and $Co_3O_4.m_1H_2O$ ($m_1$ is a positive number), carbonates such as $CoCO_3$, and basic carbonates such as $m_2CoCO_3.m_3Co(OH)_2.m_4H_2O$ ($m_2$, $m_3$ and $m_4$ are positive numbers).

Usable as Ca compounds are, for instance, one or more of carbonates, oxides and chlorides of Ca.

Usable as Sr compounds are, for instance, one or more of carbonates, oxides and chlorides of Sr.

(B) Pulverization of Calcined Body

The calcined body charged into a coarse pulverizer such as a vibration mill, a roller mill, etc. is subjected to dry coarse pulverization. Taking into consideration a load received in a subsequent wet fine pulverization step, etc., the coarsely pulverized powder preferably has an average diameter of 2-5 μm. The average diameter is measured by an air permeation method using Fischer Sub-Sieve Sizer (F.S.S.S.) as a measuring apparatus at a bulk density of 65% as a reference.

After the dry coarse pulverization, predetermined amounts of the coarsely pulverized powder and water are charged into a wet, fine pulverizer such as an attritor, a ball mill, etc., to conduct wet fine pulverization. To obtain high industrial productivity and magnetic properties, the finely pulverized powder preferably has an average diameter of 0.4-1.2 μm (measured by F.S.S.S. at a bulk density of 65% as a reference). When wet fine pulverization is conducted to obtain fine ferrite particles having an average diameter of less than 0.4 μm, the Hcj decreases due to abnormal crystal grain growth during sintering, and dewatering properties are low during wet molding. When the fine ferrite particles have an average diameter exceeding 1.2 μm, the ratio of coarse crystal grains in the sintered ferrite increases, resulting in decrease in Hcj. The average diameter of the finely pulverized powder is more preferably 0.7-1.0 μm.

0.05-1.0% by mass of $SiO_2$ is preferably added to the basic composition of the above sintered ferrite magnet at the time of wet fine pulverization. The addition of $SiO_2$ makes it possible to obtain high Hcj stably, because the addition of $SiO_2$ properly suppresses the growth of M-type ferrite particles during sintering, resulting in a dense sintered body. When the amount of $SiO_2$ added is less than 0.05%, enough adding effect cannot be obtained. When it is more than 1.0%, there is too much effect of suppressing the grain growth, resulting in deteriorated sinterability and thus a drastically reduced sintering density. The amount of $SiO_2$ added is more preferably 0.1-0.5%.

After the wet fine pulverization, the resultant slurry is concentrated for use in molding. The concentration may be carried out by centrifugal separation, filter-pressing, etc.

(C) Molding

The molding may be conducted in a dry or wet state. Molding under pressure without applying a magnetic field can produce green bodies for isotropic sintered ferrite magnets. To obtain high magnetic properties, pressure-molding in a magnetic field is preferable, thereby producing green bodies for anisotropic sintered ferrite magnets. To provide the green body with high orientation, wet molding in a magnetic field is more preferable than dry molding in a magnetic field. In the wet-molding step, slurry is molded in a magnetic field. The molding pressure is preferably about 0.1-0.5 ton/cm², and the intensity of a magnetic field applied is preferably about 398-1194 kA/m.

In the case of dry molding, for instance, the slurry is dried or heated at about 323-373 K to evaporate moisture, and then crumbled by an atomizer, etc. for use in molding. Alternatively, a green body obtained by molding the slurry in a magnetic field is pulverized by a crasher, etc., classified by a sieve to an average diameter of about 100-700 μm to produce granules oriented in a magnetic field, which is subjected to dry molding in a magnetic field. In the dry molding in a magnetic field, the pressure may be about 0.1-0.5 ton/cm², and the intensity of a magnetic field applied may be about 398-1194 kA/m.

(D) Sintering

The green body is spontaneously dried in the air or heated at 373-773 K in the air or in a nitrogen atmosphere to remove moisture, the added dispersant, etc. The green body is then sintered, for instance, at a temperature of preferably 1423-1573 K, more preferably 1433-1543 K in the air or in an atmosphere having an oxygen partial pressure of preferably more than 0.2 atm, particularly 0.4-1.0 atm, for about 0.5-3 hours. The sintered ferrite magnet of the present invention has a density of about 4.95-5.08 g/cm³.

[3] Properties of Sintered Ferrite Magnet

The measurement of 50 M-type crystal grains by a scanning electron microscope in a cross section in parallel with the c-axis indicates that the resultant anisotropic sintered ferrite magnet has an average crystal grain size of 3 μm or less, preferably 2 μm or less, further preferably 0.5-1.0 μm, in a c-axis direction. Even if the average crystal grain size exceeds 1.0 μm, high Hcj can be obtained in the present invention. In the present invention, anisotropy is given in the c-axis direction.

The sintered ferrite magnet of the present invention has high magnetic properties: for instance, a residual magnetic flux density Br of 410-460 mT, an intrinsic coercivity Hcj of 330-478 kA/m, and a squareness ratio Hk/Hcj of 85-95%, at room temperature. The Hk used herein, which is a parameter measured to obtain the Hk/Hcj, is a value on the H axis in a graph of a 4πI-H curve, wherein 4πI represents the intensity of magnetization and H represents the intensity of a magnetic field, at a position in the second quadrant where 4πI is 0.95 Br. The squareness ratio is defined as a value of Hk/Hcj obtained by dividing Hk by Hcj in the above demagnetization curve.

The sintered ferrite magnets of the present invention having excellent magnetic properties as described above are useful for starters, power steering and electronic throttles of automobiles, various motors, etc. They are also useful for magnet rolls for developing rolls in copiers.

The present invention will be described in detail referring to Examples below without intention of restricting the scope of the present invention thereto.

Example 1

Investigation 1 of Amount (x) of Ca Prior-Added, with La and Co Prior-Added and Sr Prior/Post-Added $SrCO_3$ powder (containing Ba and Ca as impurities), $CaCO_3$ powder, $La(OH)_3$ powder (purity: 99.9%), α-$Fe_2O_3$ powder, and $Co_3O_4$ powder were mixed to a basic composition of $Sr_{1-x-y}Ca_xLa_yFe_{2n-z}Co_zO_{19}$ (n=5.7, y=0.3, z=0.26, and x=0.1, 0.2 and 0.3). 100 parts by mass of the resultant mixture was mixed with 0.2 parts by mass of $SiO_2$ powder. After wet-blending, it was dried at 423 K for 24 hours in the air, and then calcined at 1523 K for 1 hour in the air.

The calcined body was subjected to dry coarse pulverization by a roller mill to obtain coarse powder having an average diameter of 5 μm (by F.S.S.S.). 45% by mass of coarse powder and 55% by mass of water were charged into an attritor and subjected to wet fine pulverization to form a slurry containing fine ferrite particles having an average diameter of 0.8 μm (by F.S.S.S.). In the early stage of the wet fine pulverization, 0.30 parts by mass of $SiO_2$ powder, 0.50 parts by mass of $SrCO_3$ powder, and 0.80 parts by mass (0.45 parts by mass when calculated as CaO) of $CaCO_3$ powder were added as sintering aids to 100 parts by mass of the coarse powder. The resultant slurry was molded under pressure in a parallel magnetic field of 796 kA/m. The resultant green body was sintered at each temperature of 1458-1513 K for 2 hours in the air.

The resultant sintered body was Worked to a shape of 10 mm high, 10 mm wide and 20 mm thick, and measured with respect to magnetic properties at room temperature (20° C.) by a B-H tracer. The measurement results are shown in FIG. 1 (white triangle: x=0.1, white square: x=0.2, white reverse triangle: x=0.3). The basic compositions of the calcined bodies and the sintered bodies are shown in the rows of Sample Nos. 2-4 in Tables 1 and 2.

Conventional Example 1

The same $SrCO_3$ powder, $CaCO_3$ powder, $La(OH)_3$ powder, $\alpha\text{-}Fe_2O_3$ powder and $Co_3O_4$ powder as in Example 1 were mixed to a basic composition of $Sr_{1-x-y}Ca_xLa_yFe_{2n-z}Co_zO_{19}$ (n=5.7, y=0.3, z=0.26, and x=0). Subsequently, calcining, pulverizing, and molding and sintering in a magnetic field were conducted in the same manner as in Example 1, and the resultant sintered body was measured with respect to magnetic properties at room temperature. The results are shown in FIG. 1 (white circle: x=0). The basic compositions of the calcined body and the sintered body are shown in the row of Sample No. 1 in Tables 1 and 2.

Comparative Example 1

The same $SrCO_3$ powder, $CaCO_3$ powder, $La(OH)_3$ powder, $\alpha\text{-}Fe_2O_3$ powder and $Co_3O_4$ powder as in Example 1 were mixed to a basic composition of $Sr_{1-x-y}Ca_xLa_yFe_{2n-z}Co_zO_{19}$ (n=5.7, y=0.3, z=0.26, and x=0.4 and 0.33). Subsequently, calcining, pulverizing, and molding and sintering in a magnetic field were conducted in the same manner as in Example 1. The magnetic properties of the resultant sintered body were measured at room temperature. The measurement results are shown by black circles and black triangles in FIG. 1. The basic compositions of the calcined bodies and the sintered bodies are shown in the rows of Sample Nos. 30, 31 in Tables 1 and 2.

TABLE 1

| No. | Sample No. | n | x | y | z | $(1-x-y)/(1-y)$ | y/x | x/z | y/z |
|---|---|---|---|---|---|---|---|---|---|
| Conventional Example 1 | 1 | 5.7 | 0 | 0.3 | 0.26 | 1.0 | — | 0 | 1.15 |
| Example 1 | 2 | 5.7 | 0.1 | 0.3 | 0.26 | 0.86 | 3.0 | 0.38 | 1.15 |
|  | 3 | 5.7 | 0.2 | 0.3 | 0.26 | 0.71 | 1.5 | 0.77 | 1.15 |
|  | 4 | 5.7 | 0.3 | 0.3 | 0.26 | 0.57 | 1.0 | 1.15 | 1.15 |
| Comparative Example 1 | 30 | 5.7 | 0.4 | 0.3 | 0.26 | 0.43 | 0.75 | 1.54 | 1.15 |
|  | 31 | 5.7 | 0.33 | 0.3 | 0.26 | 0.53 | 0.91 | 1.27 | 1.15 |

TABLE 2

| No. | Sample No. | a | b | c | d | n' | x+b | y+c | z+d | $(1-x-y+a)/(1-y+a+b)$ | $(y+c)/(z+d)$ | $(y+c)/x$ | $x/(z+d)$ |
|---|---|---|---|---|---|---|---|---|---|---|---|---|---|
| Conventional Example 1 | 1 | 0.035 | 0.082 | 0 | 0 | 5.10 | 0.082 | 0.30 | 0.26 | 0.90 | 1.15 | — | 0 |
| Example 1 | 2 | 0.035 | 0.082 | 0 | 0 | 5.10 | 0.182 | 0.30 | 0.26 | 0.78 | 1.15 | 3.00 | 0.38 |
|  | 3 | 0.035 | 0.082 | 0 | 0 | 5.11 | 0.282 | 0.30 | 0.26 | 0.65 | 1.15 | 1.50 | 0.77 |
|  | 4 | 0.034 | 0.081 | 0 | 0 | 5.11 | 0.381 | 0.30 | 0.26 | 0.53 | 1.15 | 1.00 | 1.15 |
| Comparative Example 1 | 30 | 0.034 | 0.081 | 0 | 0 | 5.11 | 0.481 | 0.30 | 0.26 | 0.41 | 1.15 | 0.75 | 1.54 |
|  | 31 | 0.034 | 0.081 | 0 | 0 | 5.11 | 0.411 | 0.30 | 0.26 | 0.49 | 1.15 | 0.91 | 1.27 |

It is clear from FIG. 1 and Tables 1 and 2 that the anisotropic sintered ferrite magnets of Example 1 having [Sr/(Sr+Ca)] ratios exceeding 49% have higher Br and Hcj than those of Conventional Example 1 and Comparative Example 1.

Example 2

Figure 2:
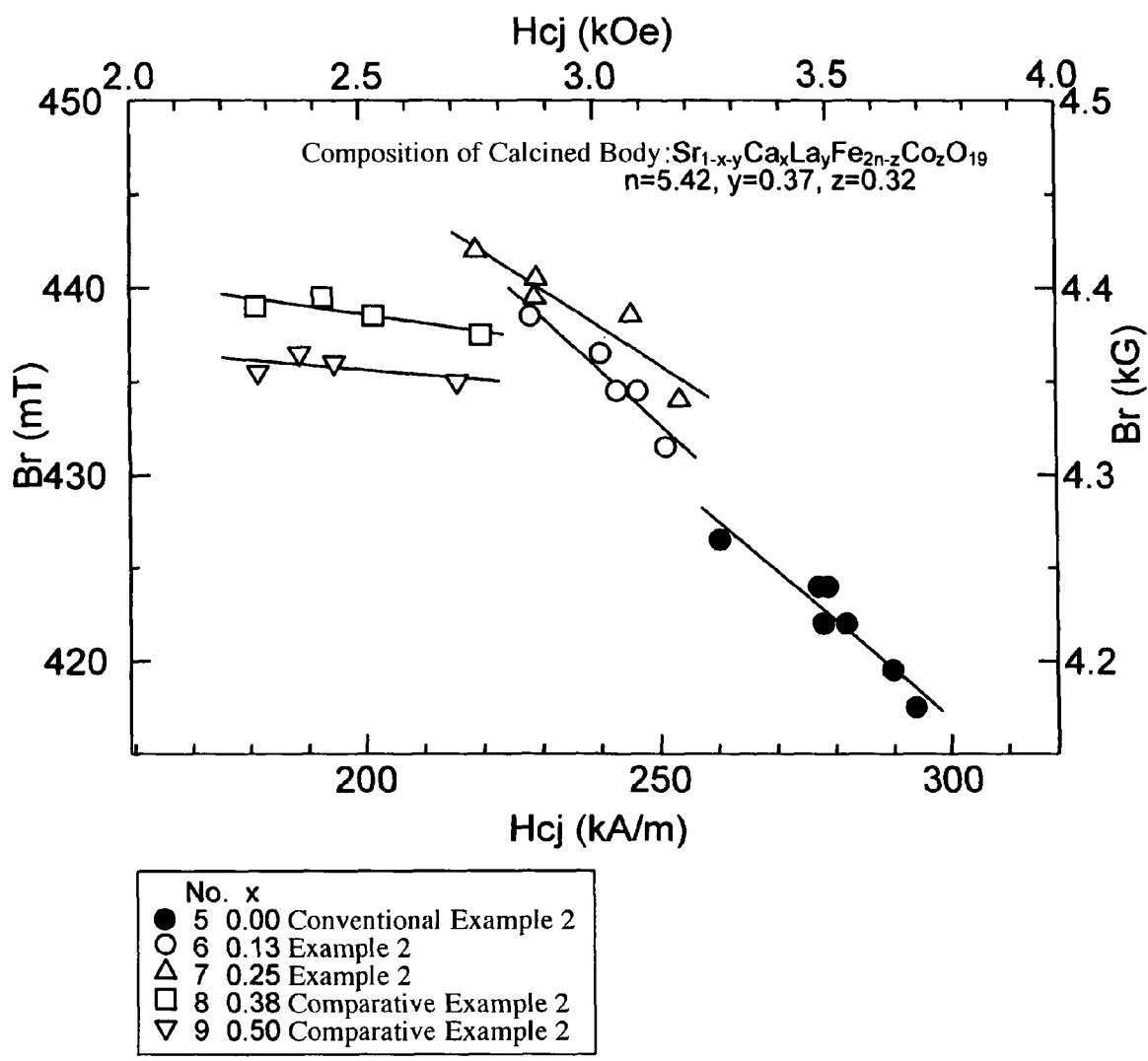
FIG. 2 is a graph showing another example of the magnetic properties of the sintered ferrite magnet of the present invention.

Investigation 2 of Amount (x) of Ca Prior-Added with La and Co Prior-Added and Sr Prior/Post-Added Calcined bodies were produced in the same manner as in Example 1, except for changing the basic compositions of calcined bodies to those of Sample Nos. 6 and 7 shown in Table 3, in which the amounts (x) of Ca prior-added were 0.13 and 0.25, respectively. Subsequently, dry coarse pulverization, wet fine pulverization, and molding and sintering in a magnetic field were conducted in the same manner as in Example 1. The resultant anisotropic sintered ferrite magnets were measured with respect to magnetic properties at room temperature. The results are shown in FIG. 2. The basic compositions of the calcined bodies and the sintered bodies are shown in Tables 3 and 4.

Conventional Example 2

Calcining, dry coarse pulverization, wet fine pulverization, and molding and sintering in a magnetic field were conducted in the same manner as in Example 2, except for changing the basic composition of a calcined body to that of Sample No. 5 shown in Table 3 (the amount (x) of Ca prior-added=0). The resultant anisotropic sintered ferrite magnet was measured with respect to magnetic properties at room temperature. The results are shown in FIG. 2. The basic compositions of the calcined body and the sintered body are shown in Tables 3 and 4.

Comparative Example 2

Calcining, dry coarse pulverization, wet fine pulverization, and molding and sintering in a magnetic field were conducted in the same manner as in Example 2, except for changing the basic compositions of calcined bodies to those of Sample Nos. 8 and 9 shown in Table 3 (the amount (x) of Ca prior-added=0.38, 0.50). The resultant anisotropic sintered ferrite magnets were measured with respect to magnetic properties at room temperature. The results are shown in FIG. 2. The basic compositions of the calcined body and the sintered body are shown in Tables 3 and 4.

TABLE 3

| No. | Sample No. | n | x | y | z |
|---|---|---|---|---|---|
| Conventional Example 2 | 5 | 5.42 | 0 | 0.37 | 0.32 |
| Example 2 | 6 | 5.42 | 0.13 | 0.37 | 0.32 |
|  | 7 | 5.42 | 0.25 | 0.37 | 0.32 |
| Comparative Example 2 | 8 | 5.42 | 0.38 | 0.37 | 0.32 |
|  | 9 | 5.42 | 0.50 | 0.37 | 0.32 |

| No. | Sample No. | $(1-x-y)/(1-y)$ | y/x | x/z | y/z |
|---|---|---|---|---|---|
| Conventional Example 2 | 5 | 1.0 | — | 0 | 1.14 |
| Example 2 | 6 | 0.79 | 2.85 | 0.39 | 1.14 |
|  | 7 | 0.60 | 1.48 | 0.78 | 1.14 |
| Comparative Example 2 | 8 | 0.40 | 0.97 | 1.17 | 1.14 |
|  | 9 | 0.21 | 0.74 | 1.56 | 1.14 |

TABLE 4

| No. | Sample No. | a | b | c | d | n' | x+b | y+c | z+d |
|---|---|---|---|---|---|---|---|---|---|
| Conventional Example 2 | 5 | 0.034 | 0.079 | 0 | 0 | 4.87 | 0.079 | 0.37 | 0.32 |
| Example 2 | 6 | 0.033 | 0.079 | 0 | 0 | 4.88 | 0.209 | 0.37 | 0.32 |
|  | 7 | 0.033 | 0.078 | 0 | 0 | 4.88 | 0.328 | 0.37 | 0.32 |
| Comparative Example 2 | 8 | 0.033 | 0.078 | 0 | 0 | 4.88 | 0.458 | 0.37 | 0.32 |
|  | 9 | 0.033 | 0.077 | 0 | 0 | 4.88 | 0.577 | 0.37 | 0.32 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Conventional Example 2 | 5 | 0.89 | 1.16 | — | 0 |
| Example 2 | 6 | 0.72 | 1.16 | 2.85 | 0.41 |
|  | 7 | 0.56 | 1.16 | 1.48 | 0.78 |
| Comparative Example 2 | 8 | 0.38 | 1.16 | 0.97 | 1.19 |
|  | 9 | 0.22 | 1.16 | 0.74 | 1.56 |

It is clear from FIG. 2 that the anisotropic sintered ferrite magnets of Example 2 (the amount (x) of Ca prior-added=0.13, 0.25) had higher magnetic properties than those of Conventional Example 2 and Comparative Example 2.

Example 3

Figure 3:
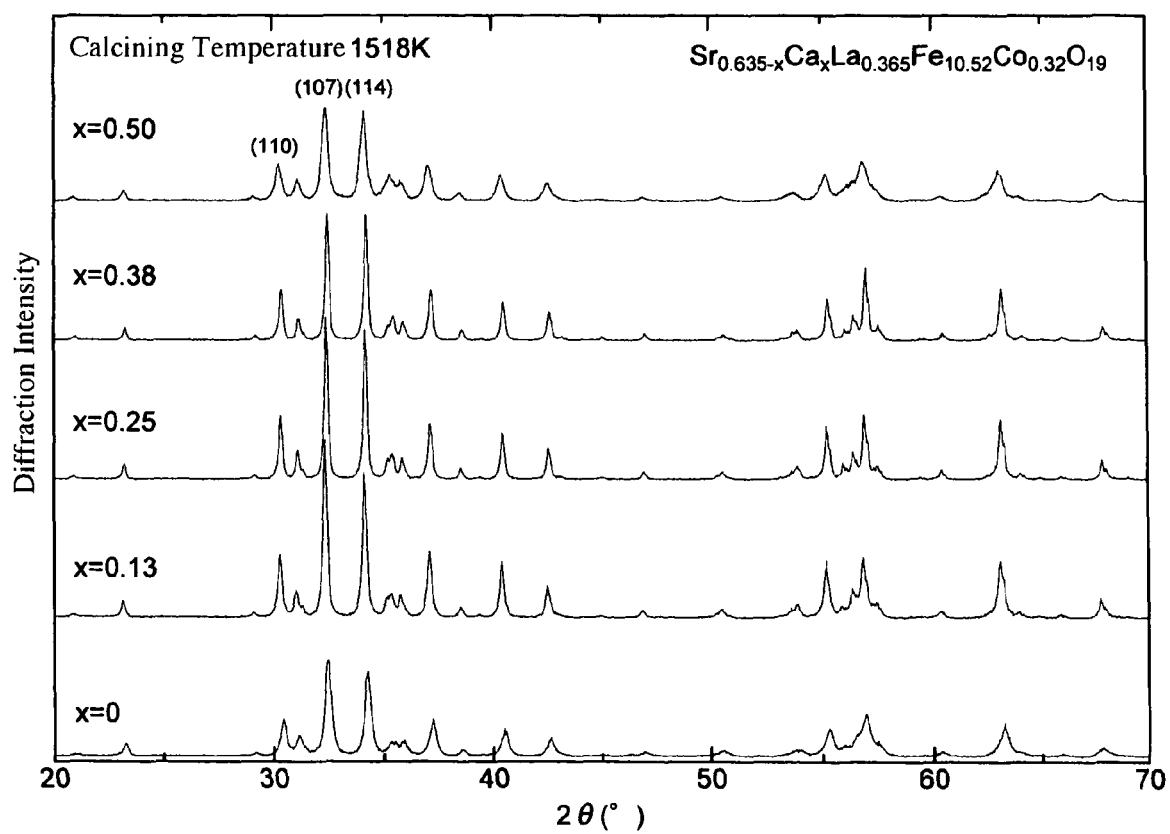
FIG. 3 is a graph showing one example of the X-ray diffraction patterns of calcined ferrite in the present invention.
Figure 4:
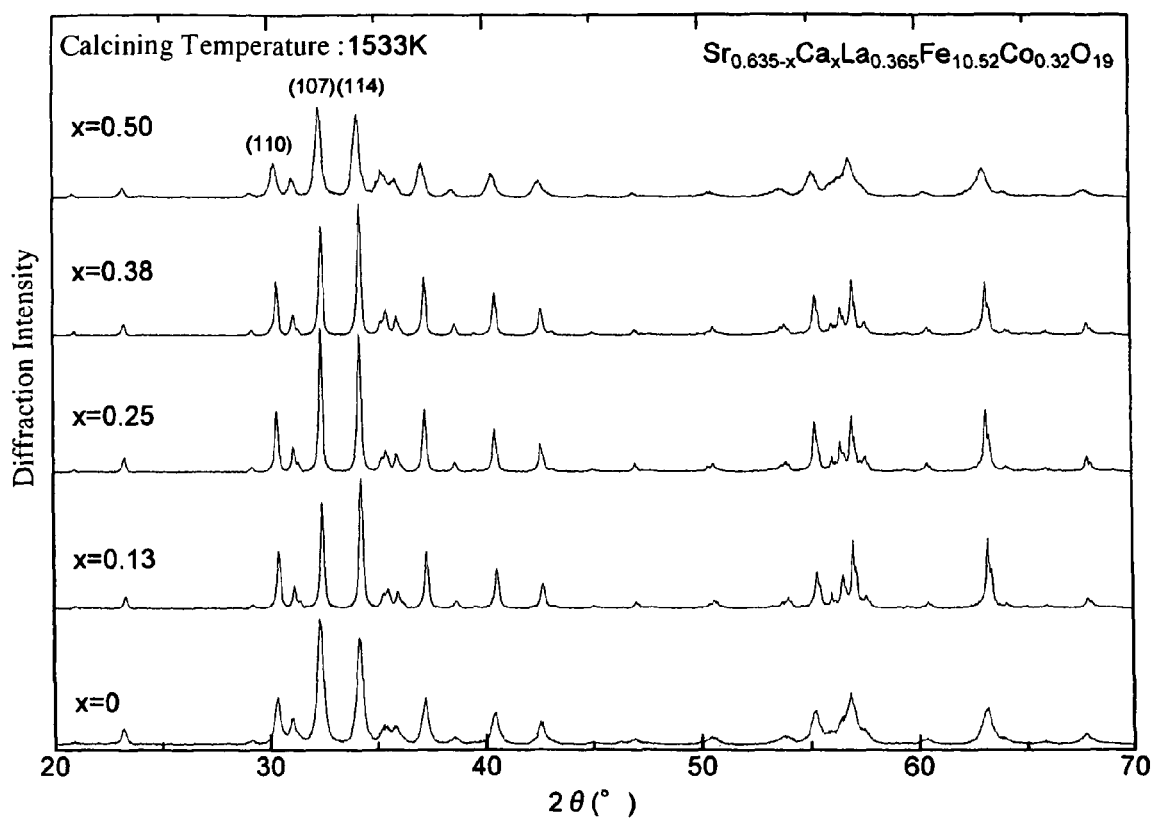
FIG. 4 is a graph showing another example of the X-ray diffraction patterns of calcined ferrite in the present invention.
Figure 5:
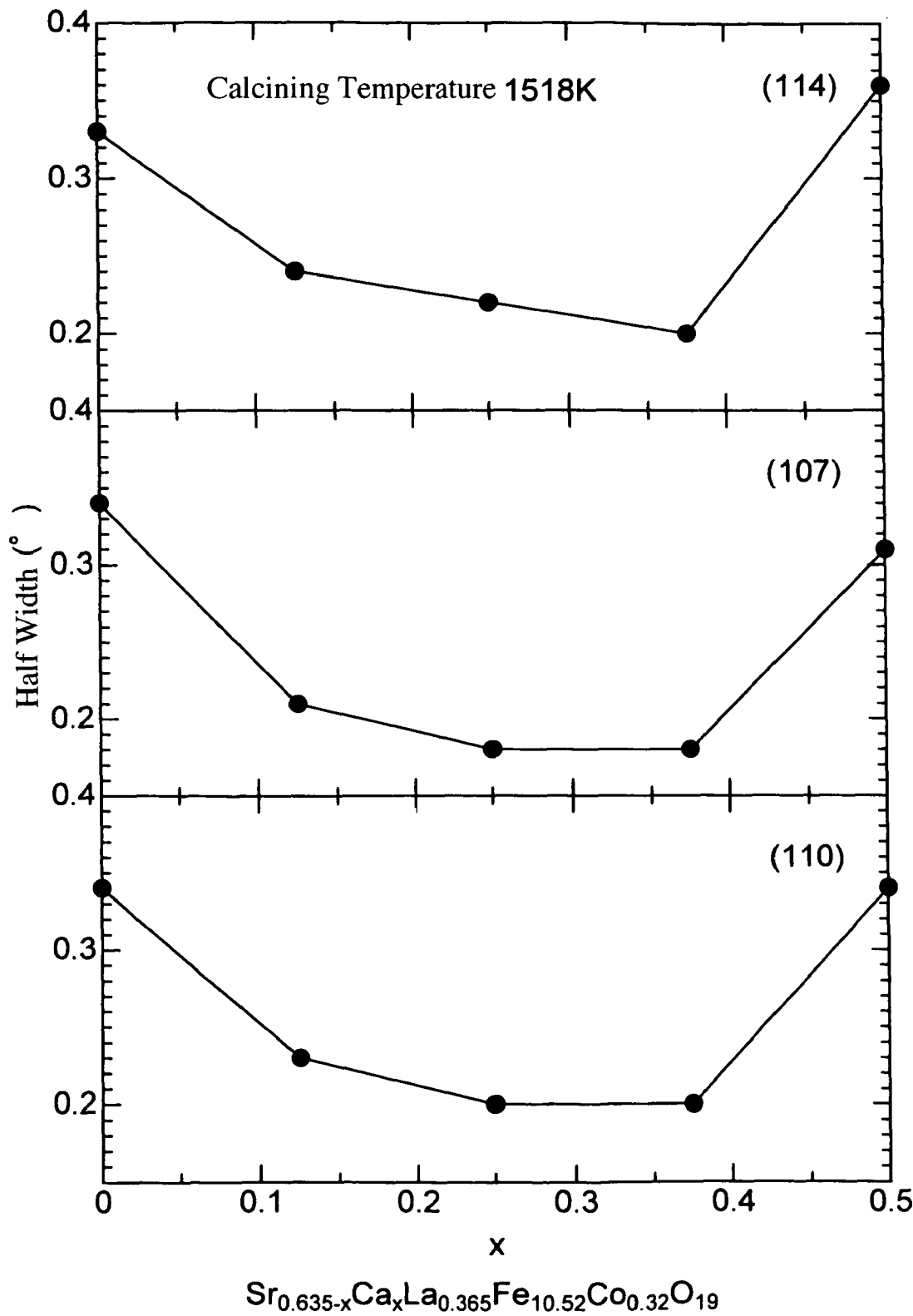
FIG. 5 is a graph showing one example of half widths of a (110) plane, a (107) plane and a (114) plane in the X-ray diffraction pattern of calcined ferrite in the present invention.
Figure 6:
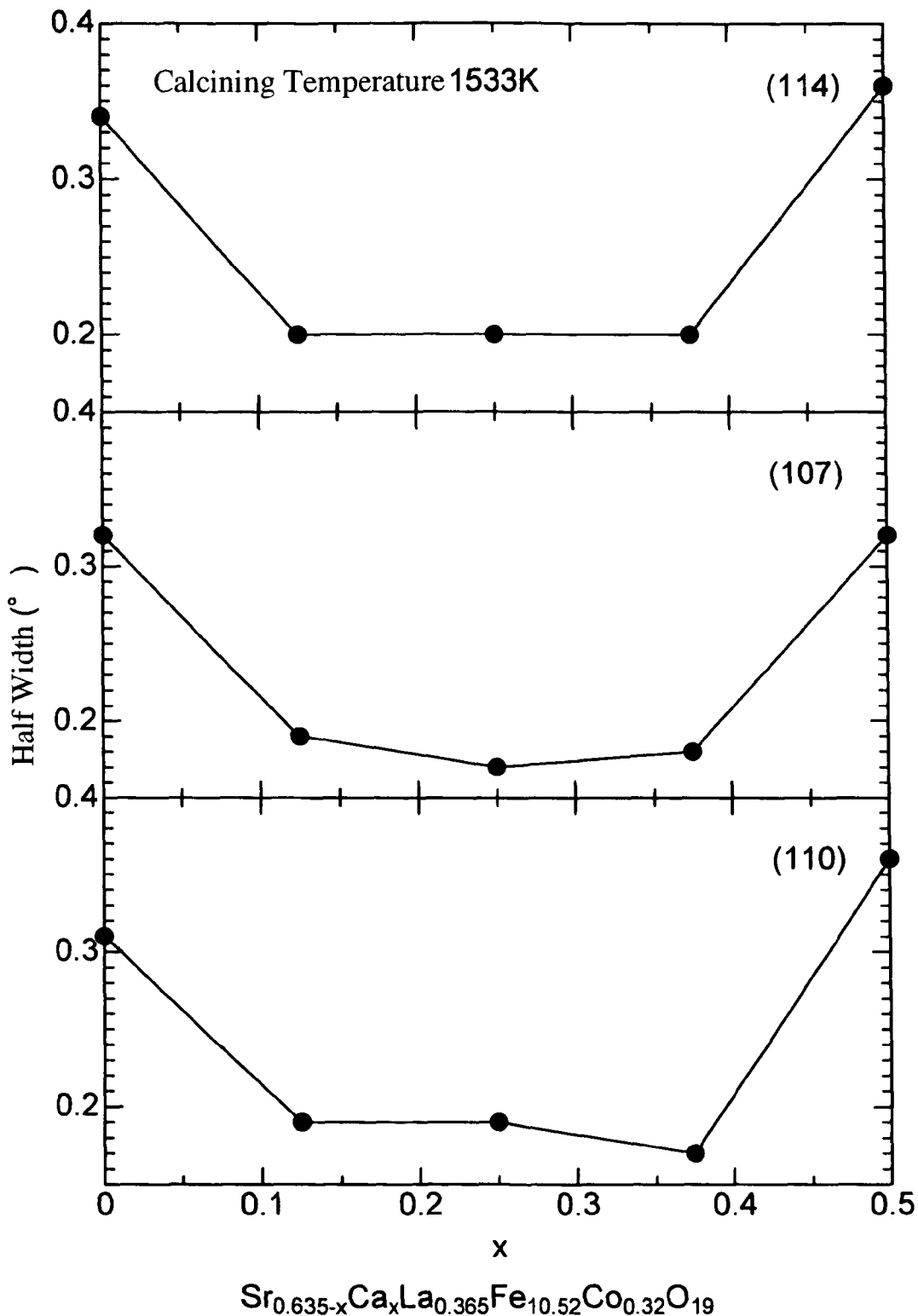
FIG. 6 is a graph showing another example of the half widths of a (110) plane, a (107) plane and a (114) plane in the X-ray diffraction pattern of calcined ferrite in the present invention.

X-ray Diffraction Patterns of Calcined Bodies and Magnetic Properties of Anisotropic Sintered Ferrite Magnets when Amount (x) of Ca Prior-Added Changed La and Co were Prior-Added, and Sr was Prior/Post-Added Calcined bodies were produced in the same manner as in Example 1, except for changing their basic compositions to those of Sample Nos. 66 and 67 shown in Table 5 (the amounts (x) of Ca prior-added=0.13, 0.25, respectively), and changing the calcining temperature to 1518 K and 1533 K, respectively. The X-ray diffraction pattern of the calcined body at a calcining temperature of 1518 K is shown in FIG. 3, and the X-ray diffraction pattern of the calcined body at a calcining temperature of 1533 K is shown in FIG. 4. The X-ray diffraction was measured by a 2θ-θ scanning method on the coarse powder of each calcined body set in an X-ray diffractmeter (RINT-2500 available from Rigaku Corporation) with an X-ray source of CuKa line. In FIGS. 3 and 4, the axis of ordinates indicates an X-ray diffraction intensity, and the axis of abscissas indicates 2θ (°). FIGS. 5 and 6 show the half widths of diffraction peaks of a (110) plane, a (107) plane and a (114) plane of the calcined bodies at calcining temperatures of 1518 K and 1533 K, respectively. The half width is a half-height width of each diffraction peak.

Each calcined body was subjected to dry coarse pulverization, wet fine pulverization, and molding and sintering in a magnetic field in the same manner as in Example 2. The measurement of the magnetic properties of the resultant anisotropic sintered ferrite magnets at room temperature indicates that the anisotropic sintered ferrite magnets of Sample Nos. 66 and 67 had substantially as high Br and Hcj as those of Example 2 (Sample Nos. 6 and 7). The basic compositions of the calcined bodies and the sintered bodies are shown in the rows of Sample Nos. 66 and 67 in Tables 5 and 6.

Conventional Example 3

A calcined body was produced in the same manner as in Example 3, except for using the basic composition shown in the row of Sample No. 65 in Table 5 (the amount (x) of Ca prior-added=0), and subjected to X-ray diffraction measurement. The results are shown in FIGS. 3-6.

The calcined body was subsequently subjected to dry coarse pulverization, wet fine pulverization, and molding and sintering in a magnetic field in the same manner as in Example 3. The measurement of the magnetic properties of the resultant anisotropic sintered ferrite magnet at room temperature indicates that its Br and Hcj were lower than those of Example 3. The basic compositions of the calcined body and the sintered body are shown in the row of Sample No. 65 in Tables 5 and 6.

Comparative Example 3

Calcined bodies were produced in the same manner as in Example 3, except for using the basic compositions of Sample Nos. 68 and 69 shown in Table 5 (the amount (x) of Ca prior-added=0.38, 0.50), and subjected to X-ray diffraction measurement. The results are shown in FIGS. 3-6.

Each calcined body was subjected to dry coarse pulverization, wet fine pulverization, and molding and sintering in a magnetic field in the same manner as in Example 3. The measurement of the magnetic properties of the resultant anisotropic sintered ferrite magnets at room temperature indicates that their Br and Hcj were lower than those of Example 3. The basic compositions of the calcined bodies and the sintered bodies are shown in the rows of Sample Nos. 68 and 69 in Tables 5 and 6.

TABLE 5

| No. | Sample No. | n | x | y | z | (1 − x − y)/(1 − y) | y/x | x/z | y/z |
|---|---|---|---|---|---|---|---|---|---|
| Conventional Example 3 | 65 | 5.42 | 0 | 0.37 | 0.32 | 1.0 | — | 0 | 1.14 |
| Example 3 | 66 | 5.42 | 0.13 | 0.37 | 0.32 | 0.79 | 2.85 | 0.39 | 1.14 |
|  | 67 | 5.42 | 0.25 | 0.37 | 0.32 | 0.60 | 1.48 | 0.78 | 1.14 |
| Comparative Example 3 | 68 | 5.42 | 0.38 | 0.37 | 0.32 | 0.40 | 0.97 | 1.17 | 1.14 |
|  | 69 | 5.42 | 0.50 | 0.37 | 0.32 | 0.21 | 0.74 | 1.56 | 1.14 |

TABLE 6

| No. | Sample No. | a | b | c | d | n' | x + b | y + c | z + d |
|---|---|---|---|---|---|---|---|---|---|
| Conventional Example 3 | 65 | 0.034 | 0.079 | 0 | 0 | 4.87 | 0.079 | 0.37 | 0.32 |
| Example 3 | 66 | 0.033 | 0.079 | 0 | 0 | 4.88 | 0.209 | 0.37 | 0.32 |
|  | 67 | 0.033 | 0.078 | 0 | 0 | 4.88 | 0.328 | 0.37 | 0.32 |
| Comparative Example 3 | 68 | 0.033 | 0.078 | 0 | 0 | 4.88 | 0.458 | 0.37 | 0.32 |
|  | 69 | 0.033 | 0.077 | 0 | 0 | 4.88 | 0.577 | 0.37 | 0.32 |

| No. | Sample No. | (1 − x − y + a)/(1 − y + a + b) | (y + c)/(z + d) | (y + c)/x | x/(z + d) |
|---|---|---|---|---|---|
| Conventional Example 3 | 65 | 0.89 | 1.16 | — | 0 |
| Example 3 | 66 | 0.72 | 1.16 | 2.85 | 0.41 |
|  | 67 | 0.56 | 1.16 | 1.48 | 0.78 |
| Comparative Example 3 | 68 | 0.38 | 1.16 | 0.97 | 1.19 |
|  | 69 | 0.22 | 1.16 | 0.74 | 1.56 |

It is clear from FIGS. 3 and 4 that any calcined body was composed only of an M phase. FIGS. 5 and 6 show that the half width was small in $0.13 \leq x \leq 0.38$, suggesting that there is a small lattice crystal strain in $0.13 \leq x \leq 0.38$. It was found that when the compositions of the calcined bodies of Example 3 ($0.13 \leq x \leq 0.25$, [Sr/(Sr+Ca)] ratio=0.60-0.79) were selected in addition to this condition, the resultant anisotropic sintered ferrite magnets had high Br and Hcj. Namely, it was found that when no Ca or too much Ca was contained, the anisotropic sintered ferrite magnets have large lattice strain, and that outside the desired [Sr/(Sr+Ca)] ratio, the resultant sintered ferrite magnets had low magnetic properties.

Example 4

Figure 7:
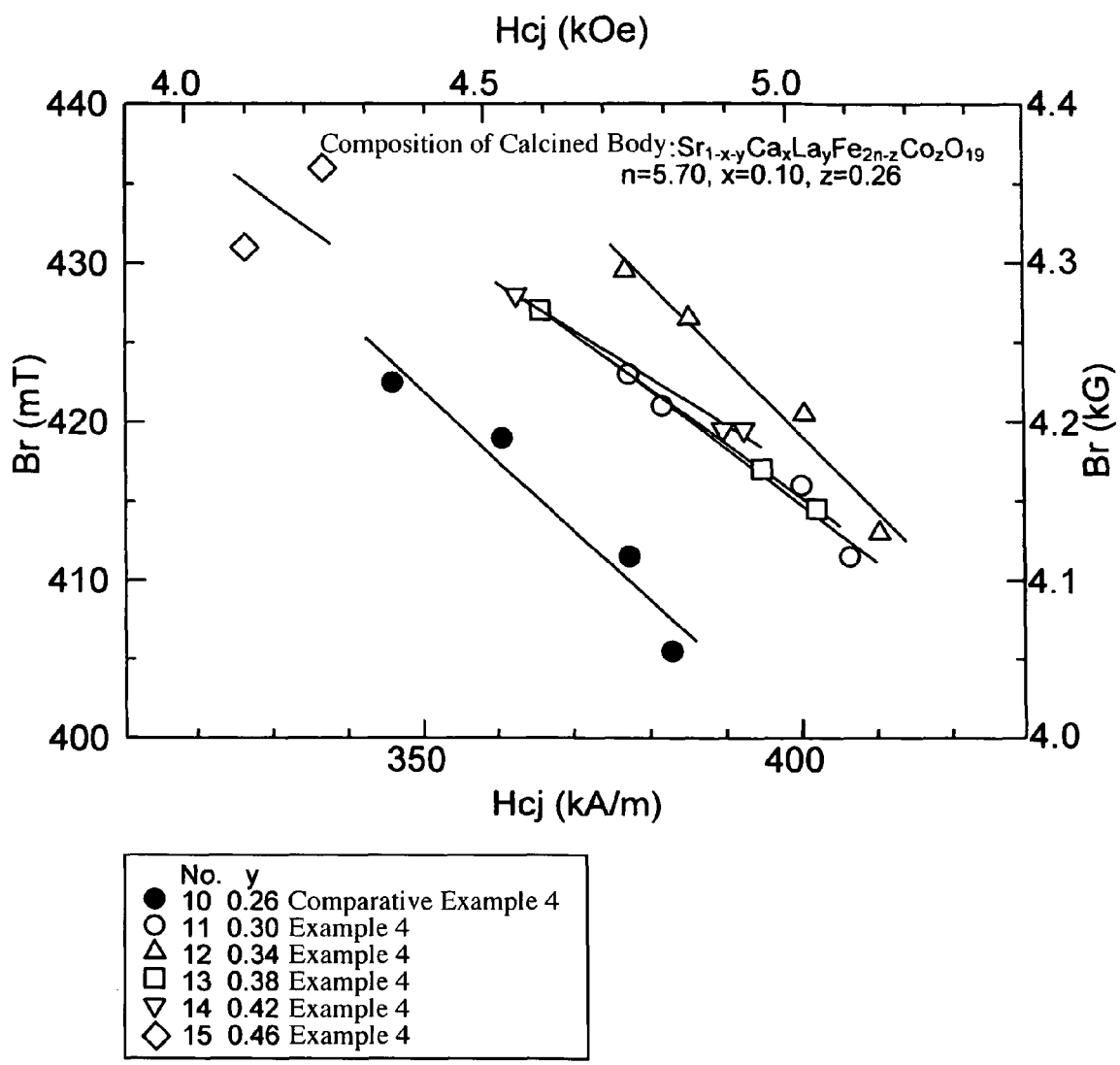
FIG. 7 is a graph showing still further example of the magnetic properties of the sintered ferrite magnet of the present invention.

Investigation 1 of Amount (y) of La Prior-Added, with Ca and Co Prior-Added and Sr Prior/Post-Added Anisotropic sintered ferrite magnets were produced in the same manner as in Example 2, except for using the basic compositions of the calcined bodies of Sample Nos. 11-15 shown in Table 7 (y=0.30-0.46), and their magnetic properties at room temperature were measured. The measurement results are shown in FIG. 7. The basic compositions of the calcined bodies and the sintered bodies are shown in Tables 7 and 8.

Comparative Example 4

An anisotropic sintered ferrite magnet was produced in the same manner as in Example 4, except for using the basic composition of the calcined body of Sample No. 10 shown in Table 7 (y=0.26), and its magnetic properties at room temperature were measured. The measurement results are shown in FIG. 7. The basic compositions of the calcined body and the sintered body are shown in Tables 7 and 8.

TABLE 7

| No. | Sample No. | n | x | y | z | (1 − x − y)/(1 − y) | y/x | x/z | y/z |
|---|---|---|---|---|---|---|---|---|---|
| Comparative Example 4 | 10 | 5.7 | 0.1 | 0.26 | 0.26 | 0.86 | 2.6 | 0.38 | 1.00 |
| Example 4 | 11 | 5.7 | 0.1 | 0.30 | 0.26 | 0.86 | 3.0 | 0.38 | 1.15 |
|  | 12 | 5.7 | 0.1 | 0.34 | 0.26 | 0.85 | 3.4 | 0.38 | 1.31 |
|  | 13 | 5.7 | 0.1 | 0.38 | 0.26 | 0.84 | 3.8 | 0.38 | 1.46 |
|  | 14 | 5.7 | 0.1 | 0.42 | 0.26 | 0.83 | 4.2 | 0.38 | 1.62 |
|  | 15 | 5.7 | 0.1 | 0.46 | 0.26 | 0.81 | 4.6 | 0.38 | 1.77 |

TABLE 8

| No. | Sample No. | n' | a | b | c | d | x + b | y + c | z + d |
|---|---|---|---|---|---|---|---|---|---|
| Comparative Example 4 | 10 | 5.11 | 0.035 | 0.082 | 0 | 0 | 0.182 | 0.26 | 0.26 |
| Example 4 | 11 | 5.11 | 0.035 | 0.082 | 0 | 0 | 0.182 | 0.30 | 0.26 |
|  | 12 | 5.10 | 0.035 | 0.082 | 0 | 0 | 0.182 | 0.34 | 0.26 |
|  | 13 | 5.10 | 0.035 | 0.082 | 0 | 0 | 0.182 | 0.38 | 0.26 |
|  | 14 | 5.10 | 0.035 | 0.083 | 0 | 0 | 0.183 | 0.42 | 0.26 |
|  | 15 | 5.10 | 0.035 | 0.083 | 0 | 0 | 0.183 | 0.46 | 0.26 |

| No. | Sample No. | (1 − x − y + a)/(1 − y + a + b) | (y + c)/(z + d) | (y + c)/x | x/(z + d) |
|---|---|---|---|---|---|
| Comparative Example 4 | 10 | 0.79 | 1.00 | 2.60 | 0.38 |
| Example 4 | 11 | 0.78 | 1.15 | 3.00 | 0.38 |
|  | 12 | 0.77 | 1.31 | 3.40 | 0.38 |
|  | 13 | 0.75 | 1.46 | 3.80 | 0.38 |
|  | 14 | 0.74 | 1.62 | 4.20 | 0.38 |
|  | 15 | 0.72 | 1.77 | 4.60 | 0.38 |

As is clear from FIG. 7, the anisotropic sintered ferrite magnets of Example 4 (Sample Nos. 11-15), in which (y/z) of the calcined bodies and (y+c)/(z+d) of the sintered bodies were within range of 1.1-1.8, had high magnetic properties. On the other hand, the anisotropic ferrite magnet of Sample No. 10 of Comparative Example 4, in which (y/z) of the calcined body and (y+c)/(z+d) of the sintered body were 1.00, had low magnetic properties.

Example 5

Figure 8:
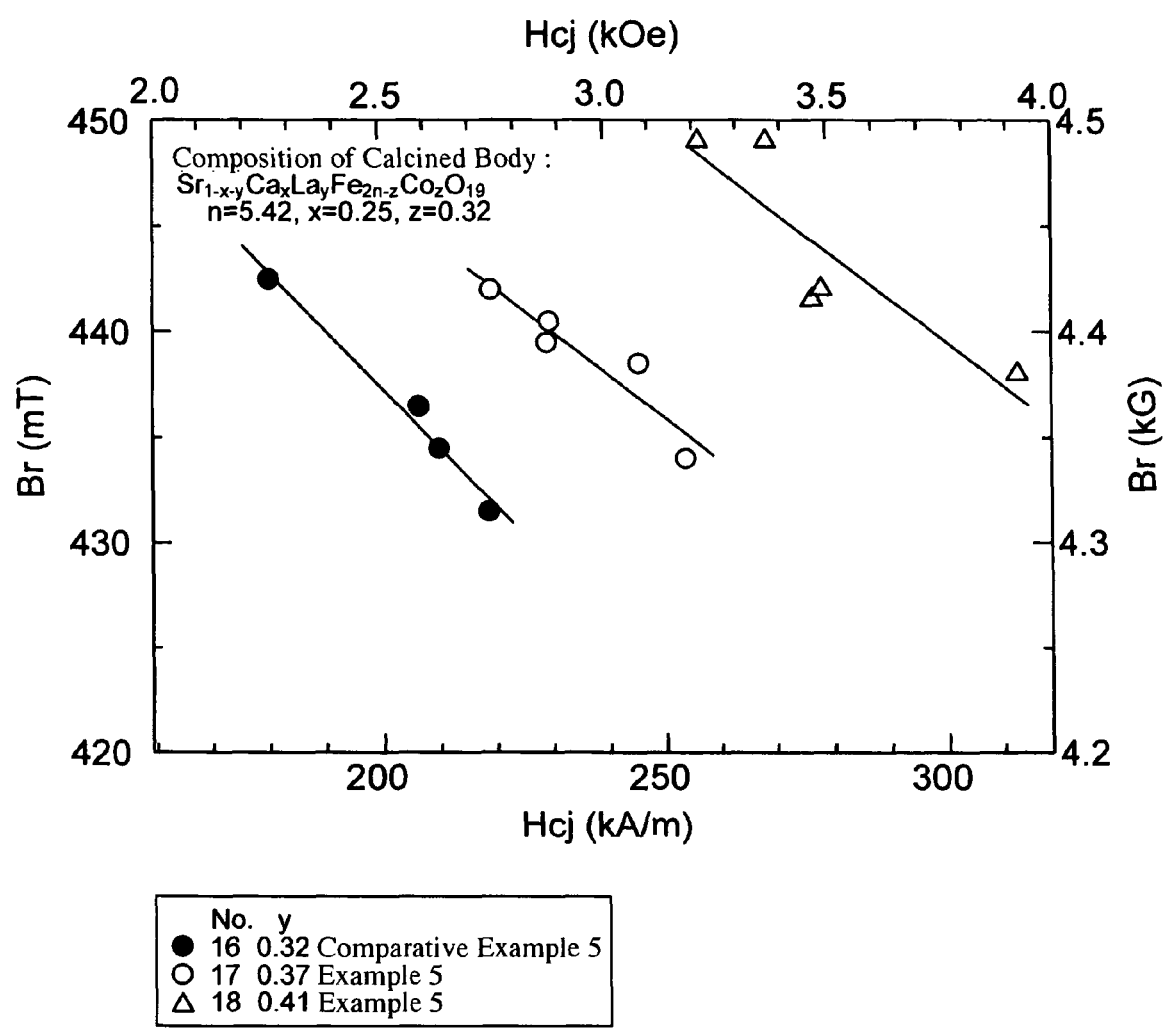
FIG. 8 is a graph showing a still further example of the magnetic properties of the sintered ferrite magnet of the present invention.

Investigation 2 of Amount (y) of La Prior-Added, with Ca and Co Prior-Added and Sr Prior/Post-Added Calcining, dry coarse pulverization, wet fine pulverization, and molding and sintering in a magnetic field were conducted to produce anisotropic sintered ferrite magnets in the same manner as in Example 2, except for using the basic compositions of the calcined bodies of Sample Nos. 17 and 18 shown in Table 9 (the amounts (y) of La prior-added=0.37, 0.41, respectively), and their magnetic properties were measured at room temperature. The results are shown in FIG. 8. The basic compositions of the calcined bodies and the sintered bodies are shown in Tables 9 and 10.

Comparative Example 5

An anisotropic sintered ferrite magnet was produced in the same manner as in Example 5, except for using the basic composition of the calcined body of Sample No. 16 shown in Table 9 (the amount (y) of La prior-added=0.32), and its magnetic properties were measured at room temperature. The results are shown in FIG. 8. The basic compositions of the calcined body and the sintered body are shown in Tables 9 and 10.

As is clear from FIG. 8 and Tables 9 and 10, the anisotropic sintered ferrite magnets of Sample Nos. 17 and 18 of Example 5, in which (y/z) of the calcined bodies and (y+c)/(z+d) of the sintered bodies were 1.16 and 1.28, respectively, had high magnetic properties. On the other hand, the anisotropic sintered ferrite magnet of Comparative Example 5, in which (y/z) of the calcined body and (y+c)/(z+d) of the sintered body were 1.00, had low magnetic properties.

Example 6

Figure 9:
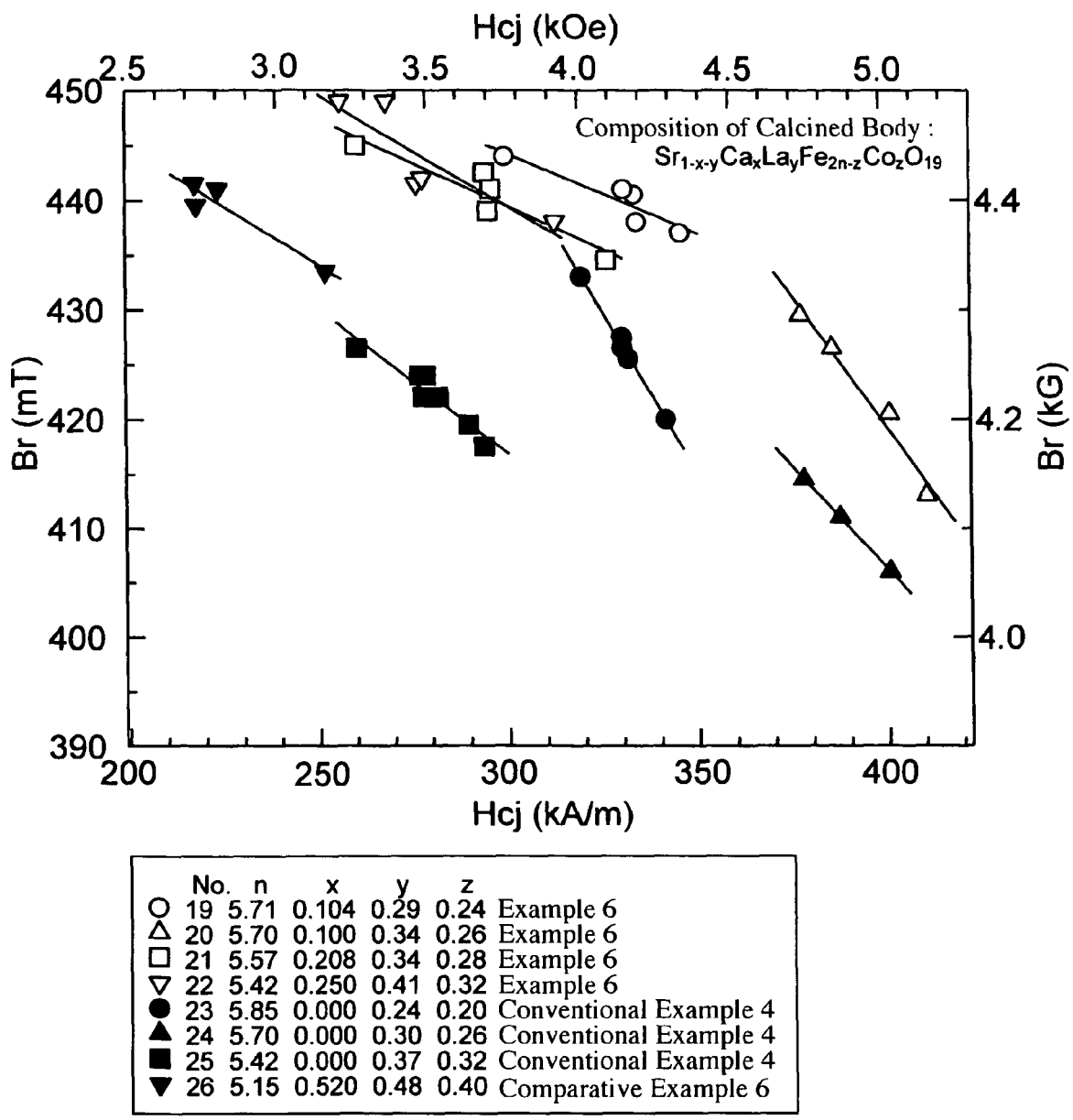
FIG. 9 is a graph showing a still further example of the magnetic properties of the sintered ferrite magnet of the present invention.

Investigation of the Amounts (x, y and z) of Ca, La and Co Prior-Added, with Sr Prior/Post-Added Calcining, dry coarse pulverization, wet fine pulverization, and molding and sintering in a magnetic field were conducted to produce anisotropic sintered ferrite magnets in the same manner as in Example 2, except for using the basic compositions of the calcined bodies of Sample Nos. 19-22 shown in Table 11 (the amount (x) of Ca prior-added=0.10-0.25, the amount (y) of La prior-added=0.29-0.41, and the amount (z) of Co prior-added=0.24-0.32). The measurement results of magnetic properties at room temperature are shown in FIG. 9. The basic compositions of the calcined bodies and the sintered bodies are shown in Tables 11 and 12.

Conventional Example 4

Anisotropic sintered ferrite magnets were produced in the same manner as in Example 6, except for using the basic compositions of the calcined bodies of Sample Nos. 23-25 shown in Table 11 (the amount (x) of Ca prior-added=0, the amount (y) of La prior-added=0.24-0.37, and the amount (z) of Co prior-added=0.20-0.32), and their magnetic properties were measured at room temperature. The results are shown in FIG. 9. The basic compositions of the calcined bodies and the sintered bodies are shown in Tables 11 and 12.

Comparative Example 6

An anisotropic sintered ferrite magnet was produced in the same manner as in Example 6, except for using the basic compositions of the calcined body of Sample No. 26 shown in Table 11 (the amount (x) of Ca prior-added=0.52, the amount (y) of La prior-added=0.48, the amount (z) of Co prior-added=0.40, and Sr=0), and its magnetic properties were measured at room temperature. The results are shown in FIG. 9. The basic compositions of the calcined body and the sintered body are shown in Tables 11 and 12.

TABLE 9

| No. | Sample No. | n | x | y | z | $(1-x-y)/(1-y)$ | y/x | x/z | y/z |
|---|---|---|---|---|---|---|---|---|---|
| Comparative Example 5 | 16 | 5.42 | 0.25 | 0.32 | 0.32 | 0.63 | 1.28 | 0.78 | 1.00 |
| Example 5 | 17 | 5.42 | 0.25 | 0.37 | 0.32 | 0.60 | 1.48 | 0.78 | 1.16 |
|  | 18 | 5.42 | 0.25 | 0.41 | 0.32 | 0.58 | 1.64 | 0.78 | 1.28 |

TABLE 10

| No. | Sample No. | a | b | c | d | n' | x+b | y+c | z+d |
|---|---|---|---|---|---|---|---|---|---|
| Comparative Example 5 | 16 | 0.033 | 0.078 | 0 | 0 | 4.88 | 0.328 | 0.32 | 0.32 |
| Example 5 | 17 | 0.033 | 0.078 | 0 | 0 | 4.88 | 0.328 | 0.37 | 0.32 |
|  | 18 | 0.033 | 0.078 | 0 | 0 | 4.88 | 0.328 | 0.41 | 0.32 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Comparative Example 5 | 16 | 0.59 | 1.00 | 1.28 | 0.78 |
| Example 5 | 17 | 0.56 | 1.16 | 1.48 | 0.78 |
|  | 18 | 0.53 | 1.28 | 1.64 | 0.78 |

TABLE 11

| No. | Sample No. | n | x | y | z | (1 − x − y)/(1 − y) | y/x | x/z | y/z |
|---|---|---|---|---|---|---|---|---|---|
| Example 6 | 19 | 5.71 | 0.10 | 0.29 | 0.24 | 0.86 | 2.90 | 0.43 | 1.20 |
|  | 20 | 5.70 | 0.10 | 0.34 | 0.26 | 0.85 | 3.40 | 0.38 | 1.31 |
|  | 21 | 5.57 | 0.21 | 0.34 | 0.28 | 0.68 | 1.62 | 0.74 | 1.20 |
|  | 22 | 5.42 | 0.25 | 0.41 | 0.32 | 0.58 | 1.64 | 0.78 | 1.28 |
| Conventional Example 4 | 23 | 5.85 | 0 | 0.24 | 0.20 | 1.0 | — | 0 | 1.20 |
|  | 24 | 5.70 | 0 | 0.30 | 0.26 | 1.0 | — | 0 | 1.15 |
|  | 25 | 5.42 | 0 | 0.37 | 0.32 | 1.0 | — | 0 | 1.14 |
| Comparative Example 6 | 26 | 5.15 | 0.52 | 0.48 | 0.40 | 0 | 0.92 | 1.08 | 1.20 |

TABLE 12

| No. | Sample No. | a | b | c | d | n' | x + b | y + c | z + d |
|---|---|---|---|---|---|---|---|---|---|
| Example 6 | 19 | 0.035 | 0.082 | 0 | 0 | 5.11 | 0.182 | 0.29 | 0.24 |
|  | 20 | 0.035 | 0.082 | 0 | 0 | 5.10 | 0.182 | 0.34 | 0.26 |
|  | 21 | 0.034 | 0.080 | 0 | 0 | 5.00 | 0.290 | 0.34 | 0.28 |
|  | 22 | 0.033 | 0.078 | 0 | 0 | 4.88 | 0.328 | 0.41 | 0.32 |
| Conventional Example 4 | 23 | 0.036 | 0.084 | 0 | 0 | 5.23 | 0.084 | 0.24 | 0.20 |
|  | 24 | 0.035 | 0.082 | 0 | 0 | 5.10 | 0.082 | 0.30 | 0.26 |
|  | 25 | 0.034 | 0.079 | 0 | 0 | 4.87 | 0.079 | 0.37 | 0.32 |
| Comparative Example 6 | 26 | 0.031 | 0.074 | 0 | 0 | 4.66 | 0.594 | 0.48 | 0.40 |

| No. | Sample No. | (1 − x − y + a)/(1 − y + a + b) | (y + c)/(z + d) | (y + c)/x | x/(z + d) |
|---|---|---|---|---|---|
| Example 6 | 19 | 0.78 | 1.21 | 2.90 | 0.42 |
|  | 20 | 0.77 | 1.31 | 3.40 | 0.38 |
|  | 21 | 0.63 | 1.21 | 1.62 | 0.75 |
|  | 22 | 0.53 | 1.28 | 1.64 | 0.78 |
| Conventional Example 4 | 23 | 0.90 | 1.20 | — | 0 |
|  | 24 | 0.90 | 1.15 | — | 0 |
|  | 25 | 0.89 | 1.16 | — | 0 |
| Comparative Example 6 | 26 | 0.05 | 1.20 | 0.92 | 1.30 |

It is clear from FIG. 9 that when the calcined bodies containing desired amounts of Ca, La, Co and Sr are subjected to coarse pulverization, fine pulverization, and molding and sintering in a magnetic field, anisotropic sintered ferrite magnets having high magnetic properties (Sample Nos. 19-22 in Example 6) can be obtained. On the other hand, the anisotropic sintered ferrite magnets of Sample Nos. 23-25 of Conventional Example 4 obtained from calcine bodies, in which the amounts of La and Co were increased without adding Ca, through dry coarse pulverization, wet fine pulverization, and molding and sintering in a magnetic field did not have high magnetic properties. The anisotropic ferrite magnet of Comparative Example 6 (Sample No. 26), to which no Sr was prior-added, also had low magnetic properties.

Example 7

Investigation 3 of amount (x) of Ca Prior-Added, with La and Co Prior-Added and Sr Prior/Post-Added The same $SrCO_3$ powder, $CaCO_3$ powder, $La(OH)_3$ powder, $\alpha$-$Fe_2O_3$ powder and $Co_3O_4$ powder as in Example 1 were mixed to a basic composition of $Sr_{1-x-y}Ca_xLa_yFe_{2n-z}Co_zO_{19}$ (n=5.8, x=0.05-0.15, y=0.24, and z=0.2). 0.2 parts by weight of $SiO_2$ powder was added to 100 parts by weight of the resultant mixture. After wet-blending the mixture, it was dried at 423 K for 24 hours in the air, and calcined at 1523 K for 1 hour in the air.

Figure 10:
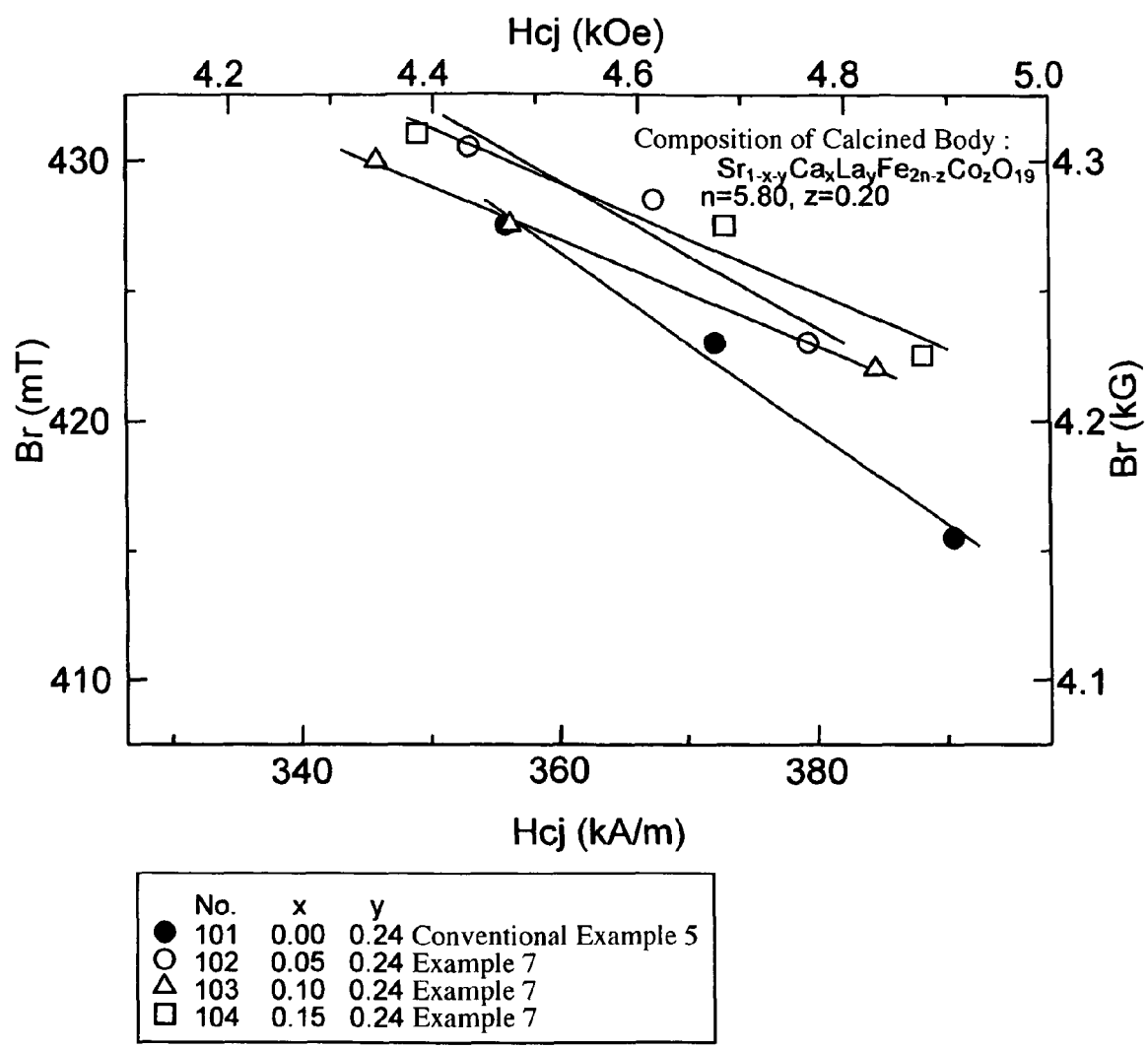
FIG. 10 is a graph showing a still further example of the magnetic properties of the sintered ferrite magnet of the present invention.

The resultant calcined body was subjected to dry coarse pulverization by a vibration disc mill to obtain coarse powder having an average diameter of 5 μm (by F.S.S.S.). This coarse powder and water were subjected to wet fine pulverization in an attritor to obtain a slurry of fine ferrite particles having an average diameter of 0.8 μm (by F.S.S.S.). 0.30 parts by weight of $SiO_2$ powder, 0.50 parts by weight of $SrCO_3$ powder, and 0.80 parts by weight (0.45 parts by weight when calculated as CaO) of $CaCO_3$ powder were added as sintering aids to 100 parts by weight of the coarsely pulverized powder in an early stage of the wet fine pulverization. The resultant slurry was molded under pressure in a parallel magnetic field of 796 kA/m. The resultant green body was sintered at 1458-1513 K for 2 hours in the air. The resultant sintered body was worked to a shape of 10 mm high, 10 mm wide and 20 mm thick, and measured with respect to magnetic properties at room temperature by a B-H tracer. The measurement results are shown in FIG. 10. The basic compositions of the calcined bodies and the sintered bodies are shown in the rows of Sample Nos. 102-104 in Tables 13 and 14.

Conventional Example 5

An anisotropic sintered ferrite magnet was produced in the same manner as in Example 7 except for changing the basic composition of the calcined body to $Sr_{1-x-y}Ca_xLa_yFe_{2n-z}Co_zO_{19}$ (n=5.8, x=0, y=0.24, and z=0.2), and its magnetic properties were measured at room temperature. The results are shown in FIG. 10. The basic compositions of the calcined body and the sintered body are shown in the row of Sample No. 101 in Tables 13 and 14.

TABLE 13

| No. | Sample No. | n | x | y | z | (1 − x − y)/(1 − y) | y/x | x/z | y/z |
|---|---|---|---|---|---|---|---|---|---|
| Conventional Example 5 | 101 | 5.8 | 0 | 0.24 | 0.2 | 1.0 | — | 0 | 1.2 |
| Example 7 | 102 | 5.8 | 0.05 | 0.24 | 0.2 | 0.93 | 4.8 | 0.25 | 1.2 |
|  | 103 | 5.8 | 0.1 | 0.24 | 0.2 | 0.87 | 2.4 | 0.50 | 1.2 |
|  | 104 | 5.8 | 0.15 | 0.24 | 0.2 | 0.80 | 1.6 | 0.75 | 1.2 |

TABLE 14

| No. | Sample No. | a | b | c | d | n' | x + b | y + c | z + d |
|---|---|---|---|---|---|---|---|---|---|
| Conventional Example 5 | 101 | 0.035 | 0.083 | 0 | 0 | 5.19 | 0.083 | 0.24 | 0.20 |
| Example 7 | 102 | 0.035 | 0.083 | 0 | 0 | 5.19 | 0.133 | 0.24 | 0.20 |

TABLE 14-continued

| | | | | | | | | |
|---|---|---|---|---|---|---|---|---|
| | 103 | 0.035 | 0.083 | 0 | 0 | 5.19 | 0.183 | 0.24 | 0.20 |
| | 104 | 0.035 | 0.083 | 0 | 0 | 5.19 | 0.233 | 0.24 | 0.20 |

| No. | Sample No. | $(1 - x - y + a)/$ $(1 - y + a + b)$ | $(y + c)/$ $(z + d)$ | $(y + c)/x$ | $x/(z + d)$ |
|---|---|---|---|---|---|
| Conventional Example 5 | 101 | 0.91 | 1.20 | — | 0 |
| Example 7 | 102 | 0.85 | 1.20 | 4.80 | 0.25 |
| | 103 | 0.79 | 1.20 | 2.40 | 0.50 |
| | 104 | 0.73 | 1.20 | 1.60 | 0.75 |

It is clear from FIG. 10 that the anisotropic sintered ferrite magnets of Example 7 (Sample Nos. 102-104) had higher magnetic properties than those Conventional Example 5 (Sample No. 101).

Example 8

Figure 11:
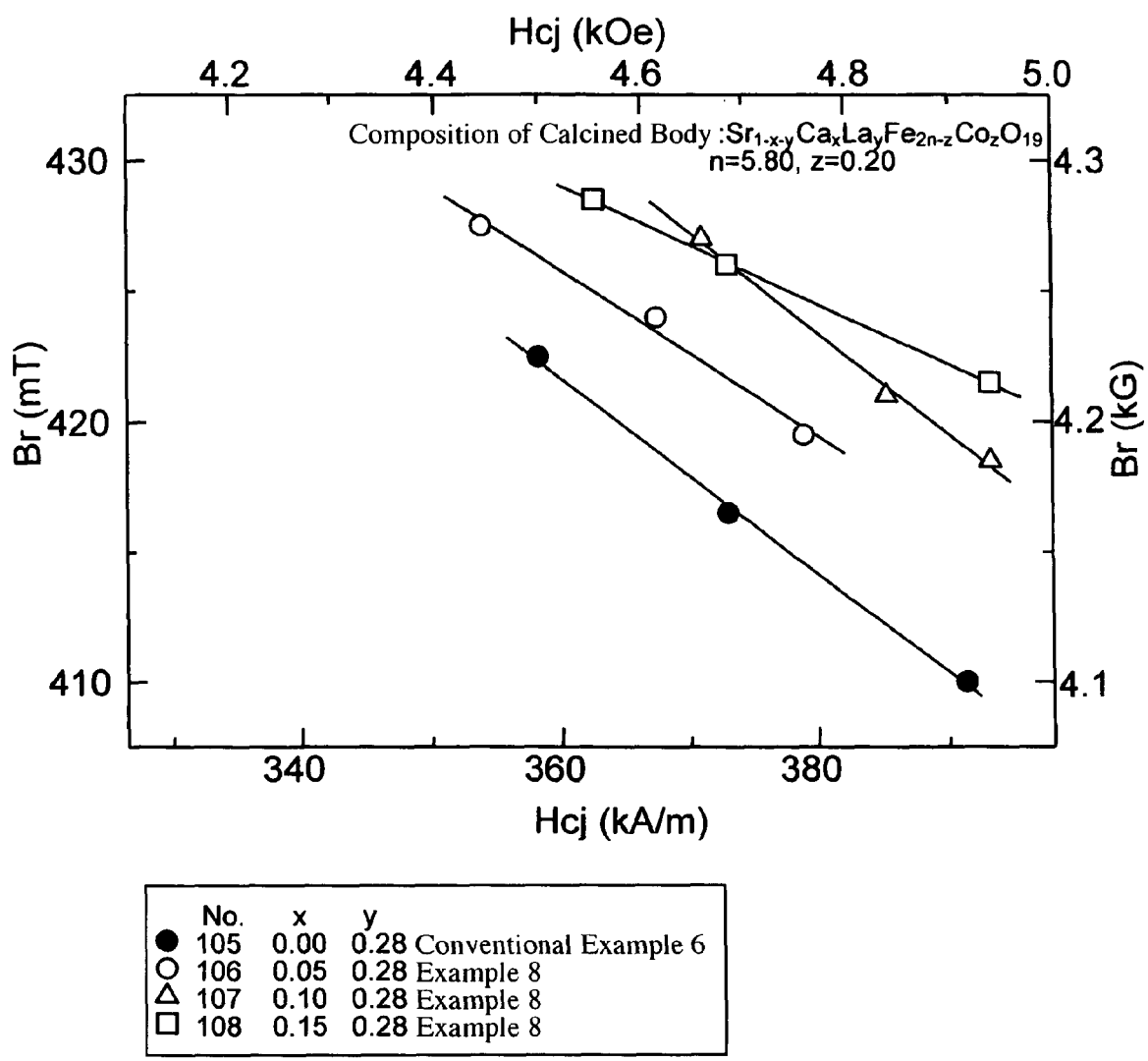
FIG. 11 is a graph showing a still further example of the magnetic properties of the sintered ferrite magnet of the present invention.

Investigation 4 of Amount (x) of Ca Prior-Added, with La and Co Prior-Added and SR Prior/Post-Added Anisotropic sintered ferrite magnets were produced in the same manner as in Example 7 except for changing the basic composition of the calcined body to $Sr_{1-x-y}Ca_xLa_yFe_{2n-z}Co_zO_{19}$ (n=5.8, x=0.05-0.15, y=0.28, and z=0.2), and their magnetic properties were measured at room temperature. The measurement results are shown in FIG. 11. The basic compositions of the calcined bodies and the sintered bodies are shown in the rows of Sample Nos. 106-108 in Tables 15 and 16.

Conventional Example 6

An anisotropic sintered ferrite magnet was produced in the same manner as in Example 8 except for changing the basic composition of the calcined body to $Sr_{1-x-y}Ca_xLa_yFe_{2n-z}Co_zO_{19}$ (n=5.8, x=0, y=0.28 and z=0.2), and its magnetic properties were measured at room temperature. The measurement results are shown in FIG. 11. The basic compositions of the calcined body and the sintered body are shown in the row of Sample No. 105 in Tables 15 and 16.

TABLE 15

| No. | Sample No. | n | x | y | z | $(1 - x - y)/$ $(1 - y)$ | y/x | x/z | y/z |
|---|---|---|---|---|---|---|---|---|---|
| Conventional Example 6 | 105 | 5.8 | 0 | 0.28 | 0.2 | 1.0 | — | 0 | 1.4 |
| Example 8 | 106 | 5.8 | 0.05 | 0.28 | 0.2 | 0.93 | 5.6 | 0.25 | 1.4 |
| | 107 | 5.8 | 0.1 | 0.28 | 0.2 | 0.86 | 2.8 | 0.50 | 1.4 |
| | 108 | 5.8 | 0.15 | 0.28 | 0.2 | 0.79 | 1.87 | 0.75 | 1.4 |

TABLE 16

| No. | Sample No. | a | b | c | d | n' | x + b | y + c | z + d |
|---|---|---|---|---|---|---|---|---|---|
| Conventional Example 6 | 105 | 0.035 | 0.084 | 0 | 0 | 5.18 | 0.084 | 0.28 | 0.20 |
| Example 8 | 106 | 0.035 | 0.083 | 0 | 0 | 5.19 | 0.133 | 0.28 | 0.20 |
| | 107 | 0.035 | 0.083 | 0 | 0 | 5.19 | 0.183 | 0.28 | 0.20 |
| | 108 | 0.035 | 0.083 | 0 | 0 | 5.19 | 0.233 | 0.28 | 0.20 |

TABLE 16-continued

| No. | Sample No. | $(1 - x - y + a)/$ $(1 - y + a + b)$ | $(y + c)/$ $(z + d)$ | $(y + c)/x$ | $x/(z + d)$ |
|---|---|---|---|---|---|
| Conventional Example 6 | 105 | 0.90 | 1.40 | — | 0 |
| Example 8 | 106 | 0.84 | 1.40 | 5.60 | 0.25 |
| | 107 | 0.78 | 1.40 | 2.80 | 0.50 |
| | 108 | 0.72 | 1.40 | 1.87 | 0.75 |

It is clear from FIG. 11 that the anisotropic sintered ferrite magnets of Example 8 (Sample Nos. 106-108) had higher magnetic properties than those of Conventional Example 6 (Sample No. 105).

Example 9

Figure 12:
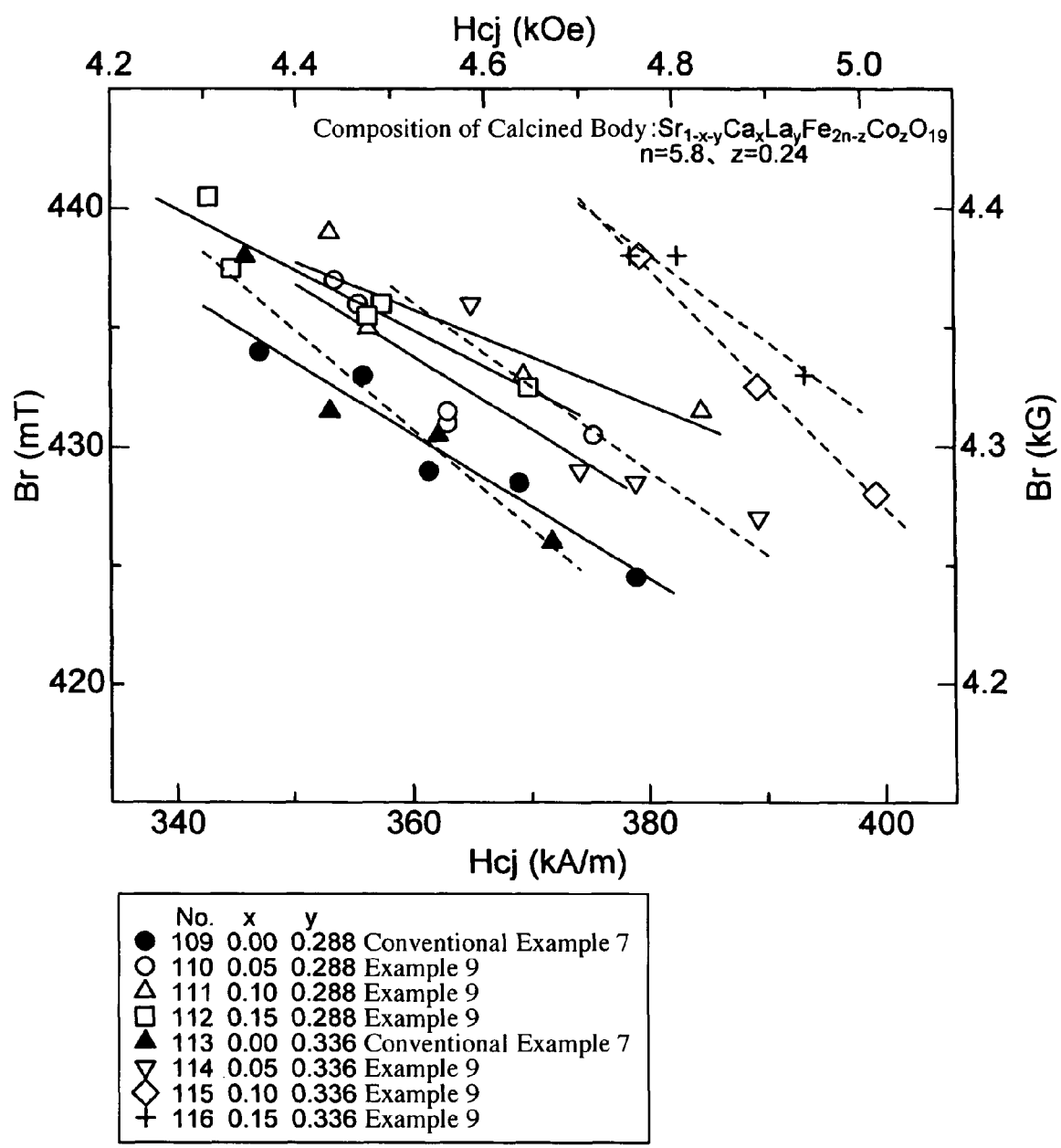
FIG. 12 is a graph showing a still further example of the magnetic properties of the sintered ferrite magnet of the present invention.

Investigation 1 of Amount (x) of Ca Prior-Added and Amount (y) of La Prior-Added, with Co Prior-Added and Sr Prior/Post-Added Anisotropic sintered ferrite magnets were produced in the same manner as in Example 7, except for using the basic compositions of the calcine bodies of Sample Nos. 110-112 and Sample Nos. 114-116 shown in Table 17, and their magnetic properties were measured at room temperature. The measurement results are shown in FIG. 12. The basic compositions of the resultant calcine bodies and the sintered bodies (Sample Nos. 110-112 and Sample Nos. 114-116) are shown in Tables 17 and 18.

Conventional Example 7

Anisotropic sintered ferrite magnets were produced in the same manner as in Example 9, except for using the basic compositions of the calcine bodies of Sample Nos. 109 and 113 shown in Table 17, and their magnetic properties were measured at room temperature. The measurement results are shown in FIG. 12. The basic compositions of the calcined bodies and the sintered bodies are shown in Tables 17 and 18.

TABLE 17

| No. | Sample No. | n | x | y | z | $(1 - x - y)/$ $(1 - y)$ | y/x | x/z | y/z |
|---|---|---|---|---|---|---|---|---|---|
| Conventional Example 7 | 109 | 5.8 | 0 | 0.29 | 0.24 | 1.0 | — | 0 | 1.2 |
| Example 9 | 110 | 5.8 | 0.05 | 0.29 | 0.24 | 0.93 | 5.8 | 0.21 | 1.2 |
| | 111 | 5.8 | 0.10 | 0.29 | 0.24 | 0.86 | 2.9 | 0.42 | 1.2 |
| | 112 | 5.8 | 0.15 | 0.29 | 0.24 | 0.79 | 1.93 | 0.63 | 1.2 |
| Conventional Example 7 | 113 | 5.8 | 0 | 0.34 | 0.24 | 1.0 | — | 0 | 1.4 |
| Example 9 | 114 | 5.8 | 0.05 | 0.34 | 0.24 | 0.92 | 6.8 | 0.21 | 1.4 |
| | 115 | 5.8 | 0.10 | 0.34 | 0.24 | 0.85 | 3.4 | 0.42 | 1.4 |
| | 116 | 5.8 | 0.15 | 0.34 | 0.24 | 0.77 | 2.27 | 0.63 | 1.4 |

TABLE 18

| No. | Sample No. | a | b | c | d | n' | x + b | y + c | z + d |
|---|---|---|---|---|---|---|---|---|---|
| Conventional Example 7 | 109 | 0.035 | 0.084 | 0 | 0 | 5.18 | 0.084 | 0.29 | 0.24 |
| Example 9 | 110 | 0.035 | 0.083 | 0 | 0 | 5.18 | 0.133 | 0.29 | 0.24 |
| | 111 | 0.035 | 0.083 | 0 | 0 | 5.19 | 0.183 | 0.29 | 0.24 |
| | 112 | 0.035 | 0.083 | 0 | 0 | 5.19 | 0.233 | 0.29 | 0.24 |

TABLE 18-continued

| | Sample No. | | | | | | | |
|---|---|---|---|---|---|---|---|---|
| Conventional Example 7 | 113 | 0.036 | 0.084 | 0 | 0 | 5.18 | 0.084 | 0.34 | 0.24 |
| Example 9 | 114 | 0.035 | 0.084 | 0 | 0 | 5.18 | 0.134 | 0.34 | 0.24 |
| | 115 | 0.035 | 0.084 | 0 | 0 | 5.18 | 0.184 | 0.34 | 0.24 |
| | 116 | 0.035 | 0.083 | 0 | 0 | 5.19 | 0.233 | 0.34 | 0.24 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Conventional Example 7 | 109 | 0.90 | 1.21 | — | 0 |
| Example 9 | 110 | 0.84 | 1.21 | 5.80 | 0.21 |
| | 111 | 0.78 | 1.21 | 2.90 | 0.42 |
| | 112 | 0.72 | 1.21 | 1.93 | 0.63 |
| Conventional Example 7 | 113 | 0.89 | 1.42 | — | 0 |
| Example 9 | 114 | 0.83 | 1.42 | 6.80 | 0.21 |
| | 115 | 0.76 | 1.42 | 3.40 | 0.42 |
| | 116 | 0.70 | 1.42 | 2.27 | 0.63 |

It is clear from FIG. 12 that the anisotropic sintered ferrite magnets of Example 9 (Sample Nos. 110-112 and Sample Nos. 114-116) had higher magnetic properties than those of Conventional Example 7 (Sample Nos. 109, 113).

Example 10

Figure 13:
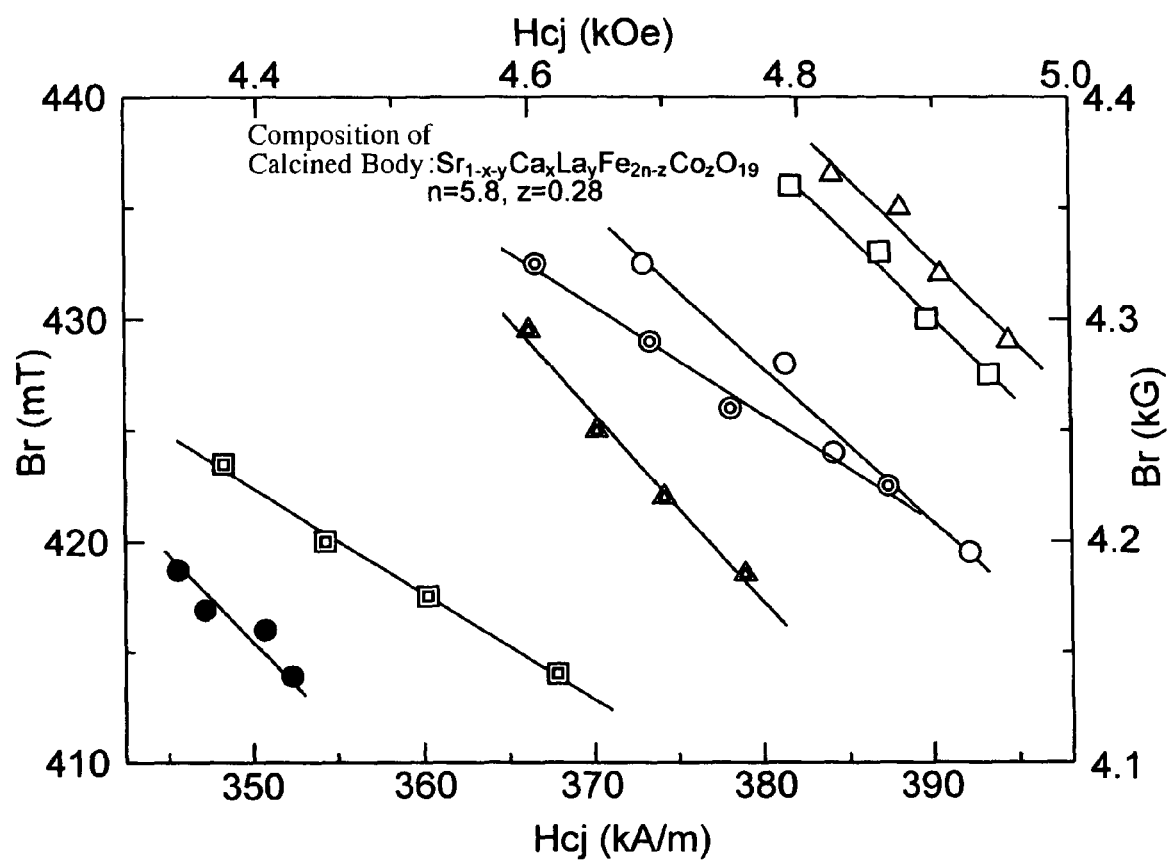
FIG. 13 is a graph showing a still further example of the magnetic properties of the sintered ferrite magnet of the present invention.

Investigation 2 of Amount (x) of Ca Prior-Added and Amount (y) of La Prior-Added, with Co Prior-Added and Sr Prior/Post-Added Anisotropic sintered ferrite magnets were produced in the same manner as in Example 7, except for using the basic compositions of the calcine bodies of Sample Nos. 117-122 shown in Table 19, and their magnetic properties were measured at room temperature. The measurement results are shown in FIG. 13. The basic compositions of the calcined bodies and the sintered bodies are shown in Tables 19 and 20.

Comparative Example 7

An anisotropic sintered ferrite magnet was produced in the same manner as in Example 10, except for using the basic composition of the calcine body of Sample No. 40 shown in Table 19, and its magnetic properties were measured at room temperature. The measurement results are shown in FIG. 13. The basic compositions of the calcined body and the sintered body are shown in Tables 19 and 20.

TABLE 19

| No. | Sample No. | n | x | y | z | $(1-x-y)/(1-y)$ | y/x | x/z | y/z |
|---|---|---|---|---|---|---|---|---|---|
| Example 10 | 117 | 5.8 | 0.10 | 0.39 | 0.28 | 0.84 | 3.9 | 0.36 | 1.4 |
| | 118 | 5.8 | 0.15 | 0.39 | 0.28 | 0.75 | 2.6 | 0.54 | 1.4 |
| | 119 | 5.8 | 0.20 | 0.39 | 0.28 | 0.67 | 1.95 | 0.71 | 1.4 |
| | 120 | 5.8 | 0.10 | 0.45 | 0.28 | 0.82 | 4.5 | 0.36 | 1.6 |
| | 121 | 5.8 | 0.15 | 0.45 | 0.28 | 0.73 | 3.0 | 0.54 | 1.6 |
| | 122 | 5.8 | 0.20 | 0.45 | 0.28 | 0.64 | 2.25 | 0.71 | 1.6 |
| Comparative Example 7 | 40 | 5.8 | 0 | 0.45 | 0.28 | 1.0 | — | — | 1.6 |

TABLE 20

| No. | Sample No. | a | b | c | d | n' | x+b | y+c | z+d |
|---|---|---|---|---|---|---|---|---|---|
| Example 10 | 117 | 0.036 | 0.084 | 0 | 0 | 5.18 | 0.184 | 0.39 | 0.28 |
| | 118 | 0.035 | 0.084 | 0 | 0 | 5.18 | 0.234 | 0.39 | 0.28 |
| | 119 | 0.035 | 0.083 | 0 | 0 | 5.19 | 0.283 | 0.39 | 0.28 |
| | 120 | 0.036 | 0.084 | 0 | 0 | 5.18 | 0.184 | 0.45 | 0.28 |
| | 121 | 0.036 | 0.084 | 0 | 0 | 5.18 | 0.234 | 0.45 | 0.28 |
| | 122 | 0.035 | 0.084 | 0 | 0 | 5.18 | 0.284 | 0.45 | 0.28 |
| Comparative Example 7 | 40 | 0.036 | 0.084 | 0 | 0 | 5.18 | 0.084 | 0.45 | 0.28 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Example 10 | 117 | 0.75 | 1.39 | 3.90 | 0.36 |
| | 118 | 0.68 | 1.39 | 2.60 | 0.54 |
| | 119 | 0.61 | 1.39 | 1.95 | 0.71 |
| | 120 | 0.73 | 1.61 | 4.50 | 0.36 |
| | 121 | 0.65 | 1.61 | 3.00 | 0.54 |
| | 122 | 0.58 | 1.61 | 2.25 | 0.71 |
| Comparative Example 7 | 40 | 0.87 | 1.61 | — | 0 |

It is clear from FIG. 13 that each anisotropic sintered ferrite magnet of Example 10 had higher magnetic properties than those of Comparative Example 7.

Example 11

Ca, La and Co Prior/Post-Added, and Sr Prior-Added

Figure 14:
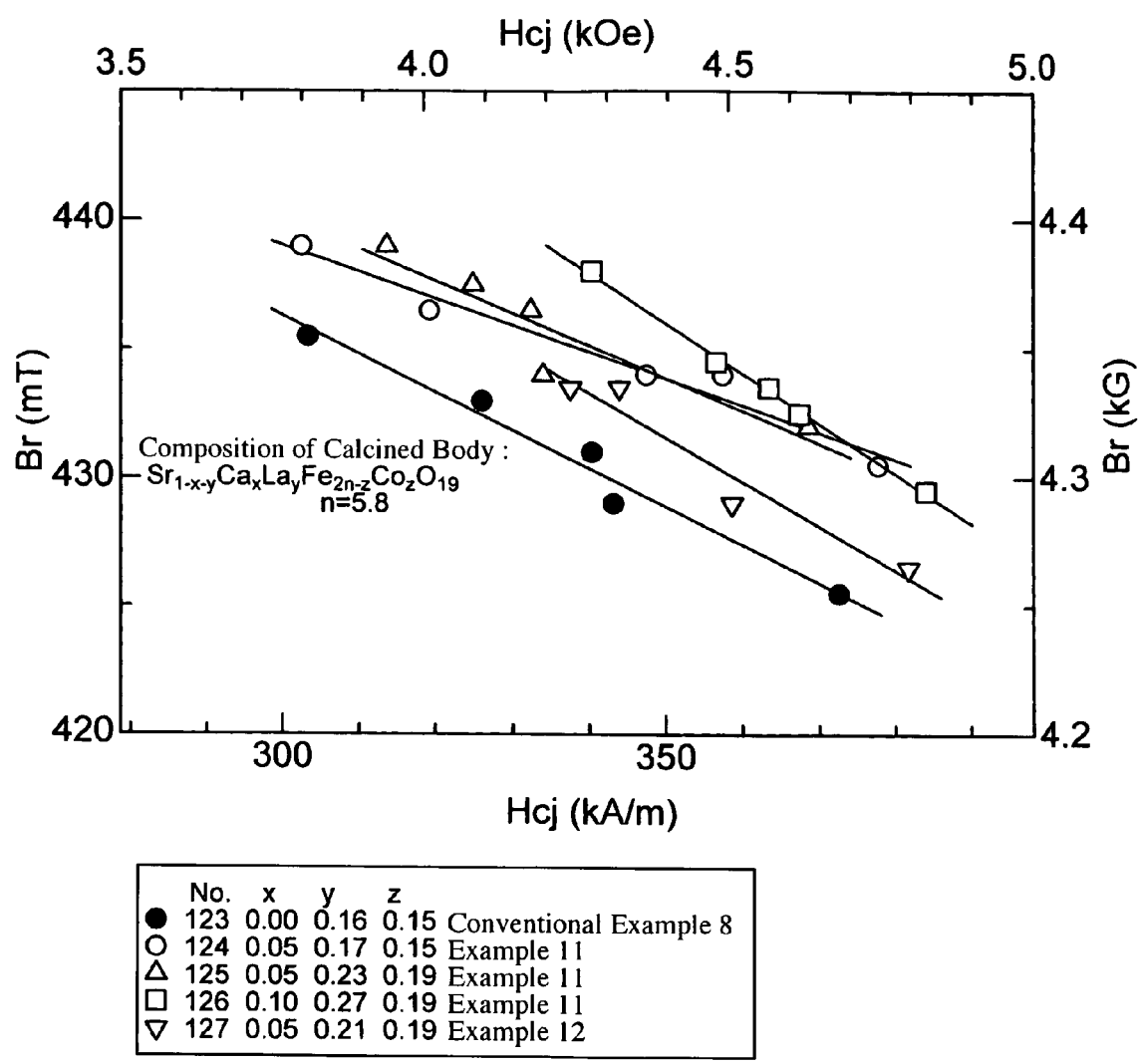

Using the same $SrCO_3$ powder, $CaCO_3$ powder, $La(OH)_3$ powder, $\alpha$-$Fe_2O_3$ powder and $Co_3O_4$ powder as in Example 1, calcined bodies were produced in the same manner as in Example 1 except for using the basic compositions of the calcined bodies of Sample Nos. 124-126 shown in Table 21. In a wet-mixing step before calcining, 0.2 parts by mass of $SiO_2$ powder was added to 100 parts by mass of the mixture. The resultant calcined bodies were subjected to dry coarse pulverization to an average diameter of 5 μm (by F.S.S.S.). The coarse powder was then subjected to wet fine pulverization by an attritor, to obtain a slurry of fine ferrite particles having an average diameter of 0.8 μm (by F.S.S.S.). In an early stage of the fine pulverization, 0.933 parts by mass of $La(OH)_3$ powder, 0.4 parts by mass of $Co_3O_4$ powder, 0.8 parts by mass of $CaCO_3$ powder, and 0.3 parts by mass of $SiO_2$ powder were added to 100 parts by mass of the coarse powder in the attritor. Each of the resultant slurries was molded and sintered in a magnetic field in the same manner as in Example 1, and each resultant anisotropic sintered ferrite magnet was measured with respect to magnetic properties at room temperature. The results are shown in FIG. 14. The anisotropic sintered ferrite magnets of Sample No. 124 sintered at 1473 K and 1483 K in the air were measured with respect to magnetic properties at room temperature. The magnetic properties and average crystal grain size in a c-axis direction (measured on 50 M-type crystal grains) are shown in Table 23. The basic compositions of the calcined bodies and the sintered bodies are shown in Tables 21 and 22.

Example 12

Ca and Sr Prior/Post-Added, and La and Co Prior-Added

A calcined body was produced in the same manner as in Example 1, except for mixing the same $SrCO_3$ powder, $CaCO_3$ powder, $La(OH)_3$ powder, $\alpha$-$Fe_2O_3$ powder and $Co_3O_4$ powder as in Example 1 to the basic composition of the calcined body of Sample No. 127 shown in Table 21. In a wet-mixing step before calcining, 0.2 parts by mass of $SiO_2$ powder was added to 100 parts by mass of the mixture. The resultant calcined body was subjected to dry coarse pulverization to an average diameter of 5 μm (by F.S.S.S.).

The resultant coarse powder and water were charged into an attritor, and finely wet-pulverized to obtain a slurry of fine ferrite particles having an average diameter of 0.8 μm (by F.S.S.S.). In an early stage of the fine pulverization, 0.5 parts by mass of $SrCO_3$ powder, 0.8 parts by mass of $CaCO_3$ powder, and 0.3 parts by mass of $SiO_2$ powder were added to 100 parts by mass of the coarse powder in the attritor.

The resultant slurry was molded and sintered in a magnetic field in the same manner as in Example 1, and the resultant anisotropic sintered ferrite magnet was measured with respect to magnetic properties at room temperature. The measurement results were plotted as Sample No. 127 in FIG. 14. The anisotropic sintered ferrite magnet of Sample No. 127 sintered at 1473 K and 1483 K was measured with respect to magnetic properties at room temperature. The magnetic properties and average crystal grain size in a c-axis direction (measured on 50 M-type crystal grains) are shown in shown in Table 23. The basic compositions of the calcined body and the sintered body are shown in the row of Sample No. 127 in Tables 21 and 22.

Conventional Example 8

An anisotropic sintered ferrite magnet was produced in the same manner as in Example 1, except for using the basic composition of the calcined body of Sample No. 123 shown in Table 21, and its magnetic properties were measured at room temperature. The measurement results are shown in FIG. 14. The basic compositions of the calcined body and the sintered body are shown in the row of Sample No. 123 in Tables 21 and 22.

TABLE 21

| No. | Sample No. | n | x | y | z | (1 − x − y)/ (1 − y) | y/x | x/z | y/z | x + b |
|---|---|---|---|---|---|---|---|---|---|---|
| Conventional Example 8 | 123 | 5.8 | 0 | 0.16 | 0.15 | 1.0 | — | 0 | 1.1 | 0.083 |
| Example 11 | 124 | 5.8 | 0.05 | 0.17 | 0.15 | 0.94 | 3.4 | 0.34 | 1.2 | 0.133 |
|  | 125 | 5.8 | 0.05 | 0.23 | 0.19 | 0.94 | 4.6 | 0.26 | 1.2 | 0.133 |
|  | 126 | 5.8 | 0.10 | 0.27 | 0.19 | 0.86 | 2.7 | 0.53 | 1.4 | 0.183 |
| Example 12 | 127 | 5.8 | 0.05 | 0.21 | 0.19 | 0.94 | 4.2 | 0.26 | 1.1 | 0.133 |

TABLE 22

| No. | Sample No. | a | b | c | d | n' | y + c | z + d |
|---|---|---|---|---|---|---|---|---|
| Conventional Example 8 | 123 | 0 | 0.083 | 0.051 | 0.052 | 5.14 | 0.211 | 0.202 |
| Example 11 | 124 | 0 | 0.083 | 0.051 | 0.052 | 5.14 | 0.221 | 0.202 |
|  | 125 | 0 | 0.083 | 0.051 | 0.052 | 5.14 | 0.281 | 0.242 |
|  | 126 | 0 | 0.083 | 0.051 | 0.052 | 5.14 | 0.321 | 0.242 |
| Example 12 | 127 | 0.035 | 0.083 | 0 | 0 | 5.19 | 0.210 | 0.190 |

| No. | Sample No. | (1 − x − y + a)/ (1 − y + a + b) | (y + c)/ (z + d) | (y + c)/x | x/(z + d) |
|---|---|---|---|---|---|
| Conventional Example 8 | 123 | 0.91 | 1.04 | — | 0 |
| Example 11 | 124 | 0.85 | 1.09 | 4.42 | 0.25 |
|  | 125 | 0.84 | 1.16 | 5.62 | 0.21 |
|  | 126 | 0.77 | 1.33 | 3.21 | 0.41 |
| Example 12 | 127 | 0.85 | 1.11 | 4.20 | 0.26 |

TABLE 23

| No. | Sample No. | Sintering Temp. (K) | Br (mT) | Hcj (kA/m) | Hk/Hcj (%) | Average Crystal Grain Size (μm) |
|---|---|---|---|---|---|---|
| Example 11 | 124 | 1473 | 431 | 377.8 | 89.6 | 0.98 |
|  |  | 1483 | 434 | 357.5 | 90.6 | 1.02 |
| Example 12 | 127 | 1473 | 429 | 358.7 | 87.9 | 0.99 |
|  |  | 1483 | 434 | 343.9 | 88.4 | 1.02 |

It is clear from FIG. 14 and Tables 21-23 that the anisotropic sintered ferrite magnets of Example 11 (Sample Nos. 124-126) (La and Co prior/post-added) obtained by adding predetermined amounts of Ca, La and Co in a mixing step before calcining, further predetermined amounts of Ca, La and Co in a pulverization step after calcining, and then molding and sintering in a magnetic field had higher magnetic properties than those of Conventional Example 8 (Sample No. 123).

It is clear from FIG. 14 and Table 23 that the anisotropic sintered ferrite magnets of Example 11 (Sample No. 124, La and Co prior/post-added) had Br not lower than and Hcj and (Hk/Hcj) higher than those of the anisotropic sintered ferrite magnets of Example 12 (Sample No. 127, La and Co prior-added). It is also clear from FIG. 14 that the anisotropic sintered ferrite magnets of Example 12 (Sample No. 127) had high magnetic properties than those of Conventional Example 8 (Sample No. 123).

Example 13

Figure 15:
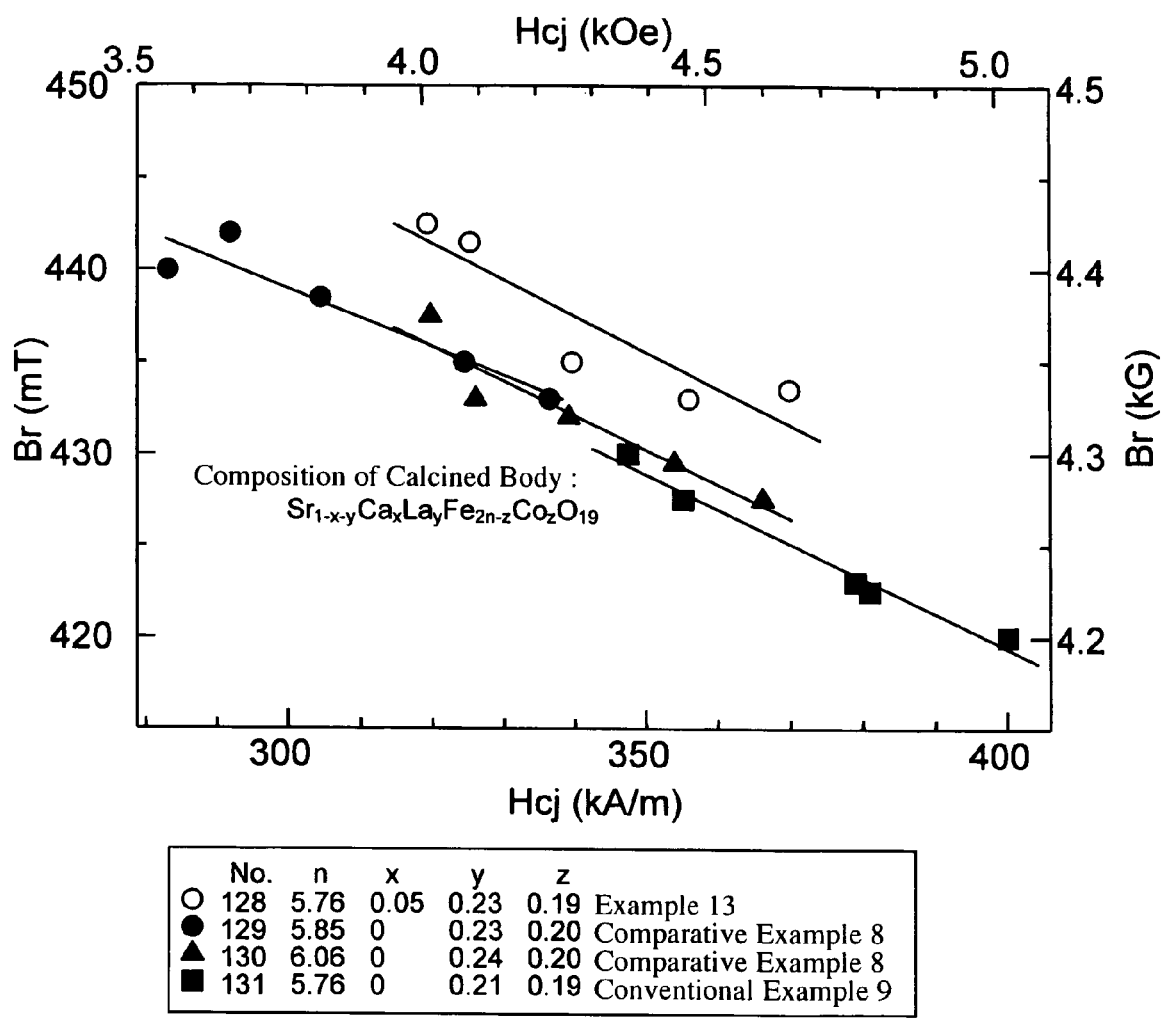
FIG. 15 is a graph showing a still further example of the magnetic properties of the sintered ferrite magnet of the present invention.

Comparison Between Prior/Post-Addition of Ca and Post-Addition of Ca, with La and Co Prior-Added Calcining, coarse pulverization, wet fine pulverization, and molding and sintering in a magnetic field were conducted to produce an anisotropic sintered ferrite magnet, in the same manner as in Example 1 except for using the basic composition of the calcined body of Sample No. 128 shown in Table 24, and its magnetic properties were measured at room temperature. The measurement results are shown in FIG. 15. The basic compositions of the calcined body and the sintered body are shown in the row of Sample No. 128 in Tables 24 and 25.

Comparative Example 8

Calcining and coarse pulverization were conducted in the same manner as in Example 1 except for using the basic compositions of the calcined bodies of Sample Nos. 129 and 130 shown in Table 24. Predetermined amounts of the resultant coarse powder and water were charged into an attritor and finely wet-pulverized. In an early stage of the wet fine pulverization, $SrCO_3$ powder, $CaCO_3$ powder and $SiO_2$ powder were added in amounts (parts by mass) per 100 parts by mass of the coarse powder charged into the attritor shown in Table 26. Incidentally, as shown in Table 26, the amount of $CaCO_3$ added in the wet fine pulverization of Sample Nos. 129 and 130 was larger than that of $CaCO_3$ added in the wet fine pulverization of Sample No. 128, such that the sintered bodies of Sample Nos. 128, 129 and 130 had substantially the same basic composition. Using the resultant slurry of fine ferrite particles, molding and sintering in a magnetic field were conducted in the same manner as in Example 1. The magnetic properties of the resultant anisotropic sintered ferrite magnets were measured at room temperature. The results are shown in FIG. 15. The basic compositions of the calcined bodies and the sintered bodies are shown in the rows of Sample Nos. 129 and 130 in Tables 24 and 25.

Conventional Example 9

Calcining, coarse pulverization, wet fine pulverization, and molding and sintering in a magnetic field were conducted in the same manner as in Example 1, except for using the basic composition of the calcined body of Sample No. 131 shown in Table 24. Incidentally, as shown in Tables 24-26, the calcined body of Sample No. 131 did not contain Ca, and the amount of $CaCO_3$ added in the fine pulverization was the same as that of Sample No. 128. Accordingly, the sintered body of Sample No. 131 had a smaller Ca content than those of Sample Nos. 128-130. The magnetic properties of the resultant anisotropic sintered ferrite magnet were measured at room temperature. The results are shown in FIG. 15. The basic compositions of the calcined body and the sintered body are shown in the row of Sample No. 131 in Tables 24 and 25.

TABLE 24

| No. | Sample No. | n | x | y | z | (1 − x − y)/ (1 − y) | y/x | x/z | y/z |
|---|---|---|---|---|---|---|---|---|---|
| Example 13 | 128 | 5.76 | 0.05 | 0.23 | 0.19 | 0.94 | 4.6 | 0.26 | 1.20 |
| Comparative Example 8 | 129 | 5.85 | 0 | 0.23 | 0.20 | 1.0 | — | 0 | 1.20 |
| | 130 | 6.06 | 0 | 0.24 | 0.20 | 1.0 | — | 0 | 1.20 |
| Conventional Example 9 | 131 | 5.76 | 0 | 0.21 | 0.19 | 1.0 | — | 0 | 1.20 |

TABLE 25

| No. | Sample No. | a | b | c | d | n' | x + b | y + c | z + d |
|---|---|---|---|---|---|---|---|---|---|
| Example 13 | 128 | 0.035 | 0.083 | 0 | 0 | 5.15 | 0.133 | 0.23 | 0.19 |
| Comparative Example 8 | 129 | 0 | 0.135 | 0 | 0 | 5.15 | 0.135 | 0.23 | 0.20 |
| | 130 | 0.037 | 0.139 | 0 | 0 | 5.15 | 0.139 | 0.24 | 0.20 |
| Conventional Example 9 | 131 | 0.035 | 0.083 | 0 | 0 | 5.15 | 0.083 | 0.21 | 0.19 |

| No. | Sample No. | (1 − x − y + a)/ (1 − y + a + b) | (y + c)/ (z + d) | (y + c)/x | x/(z + d) |
|---|---|---|---|---|---|
| Example 13 | 128 | 0.85 | 1.21 | 4.60 | 0.26 |
| Comparative Example 8 | 129 | 0.85 | 1.15 | — | 0 |
| | 130 | 0.85 | 1.20 | — | 0 |
| Conventional Example 9 | 131 | 0.91 | 1.11 | — | 0 |

TABLE 26

| No. | Sample No. | $SrCO_3$ (% by mass) | $CaCO_3$ (% by mass) | $SiO_2$ (% by mass) |
|---|---|---|---|---|
| Example 13 | 128 | 0.5 | 0.8 | 0.3 |
| Comparative Example 8 | 129 | 0 | 1.28 | 0.3 |
| | 130 | 0.5 | 1.28 | 0.3 |
| Conventional Example 9 | 131 | 0.5 | 0.8 | 0.3 |

It is clear from FIG. 15 that the anisotropic sintered ferrite magnet of Example 13 (Sample No. 128) produced by adding a predetermined amount of Ca in a mixing step before calcining had the highest magnetic properties. The anisotropic sintered ferrite magnets of Comparative Example 8 (Sample Nos. 129 and 130), to which Ca was added in an amount corresponding to that in Example 13 in a pulverization step after calcining, had slightly improved magnetic properties, but such magnetic properties were lower than those of Example 13 (Sample No. 128). The anisotropic sintered ferrite magnet of Conventional Example 9 (Sample No. 131), to which Ca was not added in a mixing step before calcining, had lower magnetic properties than those of Example 13 (Sample No. 128), and further lower magnetic properties than those of Comparative Example 8 (Sample Nos. 129 and 130).

FIG. 15 does not necessarily reveal why Example 13 (Sample No. 128) had higher magnetic properties than those of Comparative Example 8 (Sample Nos. 129 and 130), but the reason therefor may be presumably that because Ca added in a mixing step before calcining (Example 13) more enters into an M phase than Ca added in a pulverization step (Comparative Example 8), higher ratios of La and Co are included in the M phase in Example 13 than in Comparative Example 8, so that Example 13 had higher magnetic properties.

Example 14

Ca, La and Co Prior-Added, and Sr Prior/Post-Added

Coarse calcined body powder (powder obtained by coarsely pulverizing the calcined body) of Sample No. 115 of Example 9 (see Table 17) having a basic composition of $Sr_{1-x-y}Ca_xLa_yFe_{2n-z}Co_zO_{19}$ (n=5.8, x=0.10, y=0.34, and z=0.24) and water were charged into an attritor in predetermined amounts, and finely wet-pulverized to obtain a slurry of fine ferrite particles having an average diameter of 0.8 μm (by F.S.S.S.). In an early stage of the wet fine pulverization, 1.68 parts by mass of $SrCO_3$ powder and 0.30 parts by mass of $SiO_2$ powder were added to 100 parts by mass of the coarse powder charged into an attritor. Subsequently, an anisotropic sintered ferrite magnet was produced in the same manner as in Example 1. The magnetic properties of the resultant sintered body at room temperature are shown in Table 27. The basic compositions of the calcined body and the sintered body are shown in the row of Sample No. 141 in Tables 28 and 29.

TABLE 27

| No. | Sample No. | Sintering Temp. (K) | Br (mT) | Hcj (kA/m) |
|---|---|---|---|---|
| Example 14 | 141 | 1493 | 428 | 378.0 |
| Conventional Example 7 | 113 | 1483 | 426 | 371.6 |
| Example 9 | 115 | 1493 | 433 | 389.1 |

TABLE 28

| No. | Sample No. | n | x | y | z | $(1-x-y)/(1-y)$ | y/x | x/z | y/z |
|---|---|---|---|---|---|---|---|---|---|
| Example 14 | 141 | 5.8 | 0.10 | 0.34 | 0.24 | 0.85 | 3.4 | 0.42 | 1.4 |
| Conventional Example 7 | 113 | 5.8 | 0 | 0.34 | 0.24 | 1.0 | — | 0 | 1.4 |
| Example 9 | 115 | 5.8 | 0.10 | 0.34 | 0.24 | 0.85 | 3.4 | 0.42 | 1.4 |

TABLE 29

| No. | Sample No. | a | b | c | d | n' | x + b | y + c | z + d |
|---|---|---|---|---|---|---|---|---|---|
| Example 14 | 141 | 0.119 | 0 | 0 | 0 | 5.18 | 0.10 | 0.34 | 0.24 |
| Conventional Example 7 | 113 | 0.036 | 0.084 | 0 | 0 | 5.18 | 0.084 | 0.34 | 0.24 |
| Example 9 | 115 | 0.035 | 0.084 | 0 | 0 | 5.18 | 0.184 | 0.34 | 0.24 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Example 14 | 141 | 0.87 | 1.42 | 3.4 | 0.42 |
| Conventional Example 7 | 113 | 0.89 | 1.42 | — | 0 |
| Example 9 | 115 | 0.76 | 1.42 | 3.4 | 0.42 |

It is clear from Tables 27-29 that the anisotropic sintered ferrite magnet of Example 14 (Sample No. 141), to which Ca was prior-added, had higher magnetic properties than those of Conventional Example 7 (Sample No. 113).

Example 15

La Prior-Added, and Co Prior-Added

The same $SrCO_3$ powder, $CaCO_3$ powder, $La(OH)_3$ powder, $\alpha$-$Fe_2O_3$ powder and CoOOH powder as in Example 1 were wet-mixed and calcined at 1523 K for 1 hour in the air, to produce a calcined body having the basic composition of Sample No. 151 shown in Table 30. In the wet-mixing step, 0.2 parts by mass of $SiO_2$ powder were added to 100 parts by mass of the wet mixture. The resultant calcined body was coarsely dry-pulverized to an average diameter of 5 μm (by F.S.S.S.), and then finely wet-pulverized to obtain a slurry of fine ferrite particles having an average diameter of 0.8 μm (by F.S.S.S.). In an early stage of the fine pulverization, $CaCO_3$ powder and $SiO_2$ powder in amounts of 1.10 parts by mass and 0.3 parts by mass, respectively, were added to 100 parts by mass of the coarse powder charged into an attritor. The resultant slurry was molded and sintered in a magnetic field (at 1458-1513 K for 2 hours in the air). The magnetic properties of the resultant anisotropic sintered ferrite magnet were measured at room temperature. The results are plotted as Sample No. 151 in FIG. 16. The basic compositions of the calcined body and the sintered body are shown in the row of Sample No. 151 in Tables 30 and 31.

Example 16

La Prior-Added, and Co Prior/Post-Added

A calcined body having the basic composition of Sample No. 152 shown in Table 30 was produced and coarsely dry-pulverized in the same manner as in Example 15. Predetermined amounts of the coarse powder and water were then charged into an attritor, and finely wet-pulverized to obtain a slurry of fine ferrite particles having an average diameter of 0.8 μm (by F.S.S.S.). In an early stage of the fine pulverization, CoOOH powder, $CaCO_3$ powder and $SiO_2$ powder were added in amounts of 1.07 parts by mass, 1.11 parts by mass and 0.3 parts by mass, respectively, to 100 parts by mass of the coarse powder charged into an attritor. The resultant slurry was subsequently molded and sintered in a magnetic field in the same manner as in Example 15, and the magnetic properties of the resultant anisotropic sintered ferrite magnet were measured at room temperature. The measurement results are plotted as Sample No. 152 in FIG. 16. The basic compositions of the calcined body and the sintered body are shown in the row of Sample No. 152 in Tables 30 and 31.

Example 17

La Prior-Added, Co Post-Added

A calcined body having the basic composition of Sample No. 153 shown in Table 30 was produced and coarsely dry-pulverized in the same manner as in Example 15. Predetermined amounts of the coarse powder and water were then charged into an attritor, and finely wet-pulverized to obtain a slurry of fine ferrite particles having an average diameter of 0.8 μm (by F.S.S.S.). In an early stage of the fine pulverization, CoOOH powder, $CaCO_3$ powder and $SiO_2$ powder were added in amounts of 2.15 parts by mass, 1.12 parts by mass and 0.3 parts by mass, respectively, to 100 parts by mass of the coarse powder charged into an attritor. The resultant slurry was subsequently molded and sintered in a magnetic field in the same manner as in Example 15, and the magnetic properties of the resultant anisotropic sintered ferrite magnet were measured at room temperature. The measurement results were plotted as Sample No. 153 in FIG. 16. The basic compositions of the calcined body and the sintered body are shown in the row of Sample No. 153 in Tables 30 and 31.

Example 18

La Prior/Post-Added, and Co Prior-Added

A calcined body having the basic composition of Sample No. 154 shown in Table 30 was produced and coarsely dry-pulverized in the same manner as in Example 15. Predetermined amounts of the coarse powder and water were then charged into an attritor, and finely wet-pulverized to obtain a slurry of fine ferrite particles having an average diameter of 0.8 μm (by F.S.S.S.). In an early stage of the fine pulverization, $La(OH)_3$ powder, $CaCO_3$ powder and $SiO_2$ powder were added in amounts of 0.47 parts by mass, 1.08 parts by mass and 0.3 parts by mass, respectively, to 100 parts by mass of the coarse powder charged into the attritor. The resultant slurry was subsequently molded and sintered in a magnetic field in the same manner as in Example 15, and the magnetic properties of the resultant anisotropic sintered ferrite magnet were measured at room temperature. The measurement results were plotted as Sample No. 154 in FIG. 16. The basic compositions of the calcined body and the sintered body are shown in the row of Sample No. 154 in Tables 30 and 31.

Example 19

La Prior/Post-Added, and Co Post-Added

A calcined body having the basic composition of Sample No. 155 shown in Table 30 was produced and coarsely dry-pulverized in the same manner as in Example 15. Predetermined amounts of the coarse powder and water were then charged into an attritor, and finely wet-pulverized to obtain a slurry of fine ferrite particles having an average diameter of 0.8 μm (by F.S.S.S.). In an early stage of the fine pulverization, $La(OH)_3$ powder, CoOOH powder and $SiO_2$ powder were added in amounts of 0.47 parts by mass, 2.07 parts by mass and 0.3 parts by mass, respectively, to 100 parts by mass of the coarse powder charged into the attritor. The resultant slurry was subsequently molded and sintered in a magnetic field in the same manner as in Example 15, and the magnetic properties of the resultant anisotropic sintered ferrite magnet were measured at room temperature. The measurement results were plotted as Sample No. 155 in FIG. 16. The basic compositions of the calcined body and the sintered body are shown in the row of Sample No. 155 in Tables 30 and 31.

TABLE 30

| No. | Sample No. | La | Co | n | x | y | z |
|---|---|---|---|---|---|---|---|
| Example 15 | 151 | Prior-Added | Prior-Added | 5.80 | 0.10 | 0.34 | 0.24 |
| Example 16 | 152 | Prior-Added | Prior/Post-Added | 5.74 | 0.10 | 0.34 | 0.12 |
| Example 17 | 153 | Prior-Added | Post-Added | 5.68 | 0.10 | 0.34 | 0 |
| Example 18 | 154 | Prior/Post-Added | Prior-Added | 5.95 | 0.10 | 0.31 | 0.24 |
| Example 19 | 155 | Prior/Post-Added | Post-Added | 5.95 | 0.10 | 0.31 | 0 |

| No. | Sample No. | $(1-x-y)/(1-y)$ | y/x | x/z | y/z |
|---|---|---|---|---|---|
| Example 15 | 151 | 0.85 | 3.4 | 0.42 | 1.42 |
| Example 16 | 152 | 0.85 | 3.4 | 0.83 | 2.83 |
| Example 17 | 153 | 0.85 | 3.4 | — | — |
| Example 18 | 154 | 0.86 | 3.1 | 0.42 | 1.29 |
| Example 19 | 155 | 0.86 | 3.1 | — | — |

TABLE 31

| No. | Sample No. | a | b | c | d | n' | x+b | y+c | z+d |
|---|---|---|---|---|---|---|---|---|---|
| Example 15 | 151 | 0 | 0.115 | 0 | 0 | 5.20 | 0.215 | 0.34 | 0.24 |
| Example 16 | 152 | 0 | 0.115 | 0 | 0.12 | 5.20 | 0.215 | 0.34 | 0.24 |
| Example 17 | 153 | 0 | 0.115 | 0 | 0.24 | 5.20 | 0.215 | 0.34 | 0.24 |
| Example 18 | 154 | 0 | 0.115 | 0.026 | 0 | 5.21 | 0.215 | 0.34 | 0.24 |
| Example 19 | 155 | 0 | 0.115 | 0.026 | 0.24 | 5.32 | 0.215 | 0.34 | 0.24 |

TABLE 31-continued

| No. | Sample No. | $(1-x-y+a)/(1-y+a+b)$ | $(y+c)/(z+d)$ | $(y+c)/x$ | $x/(z+d)$ |
|---|---|---|---|---|---|
| Example 15 | 151 | 0.72 | 1.42 | 3.4 | 0.42 |
| Example 16 | 152 | 0.72 | 1.42 | 3.4 | 0.42 |
| Example 17 | 153 | 0.72 | 1.42 | 3.4 | 0.42 |
| Example 18 | 154 | 0.73 | 1.42 | 3.4 | 0.42 |
| Example 19 | 155 | 0.73 | 1.42 | 3.4 | 0.42 |

Figure 16:
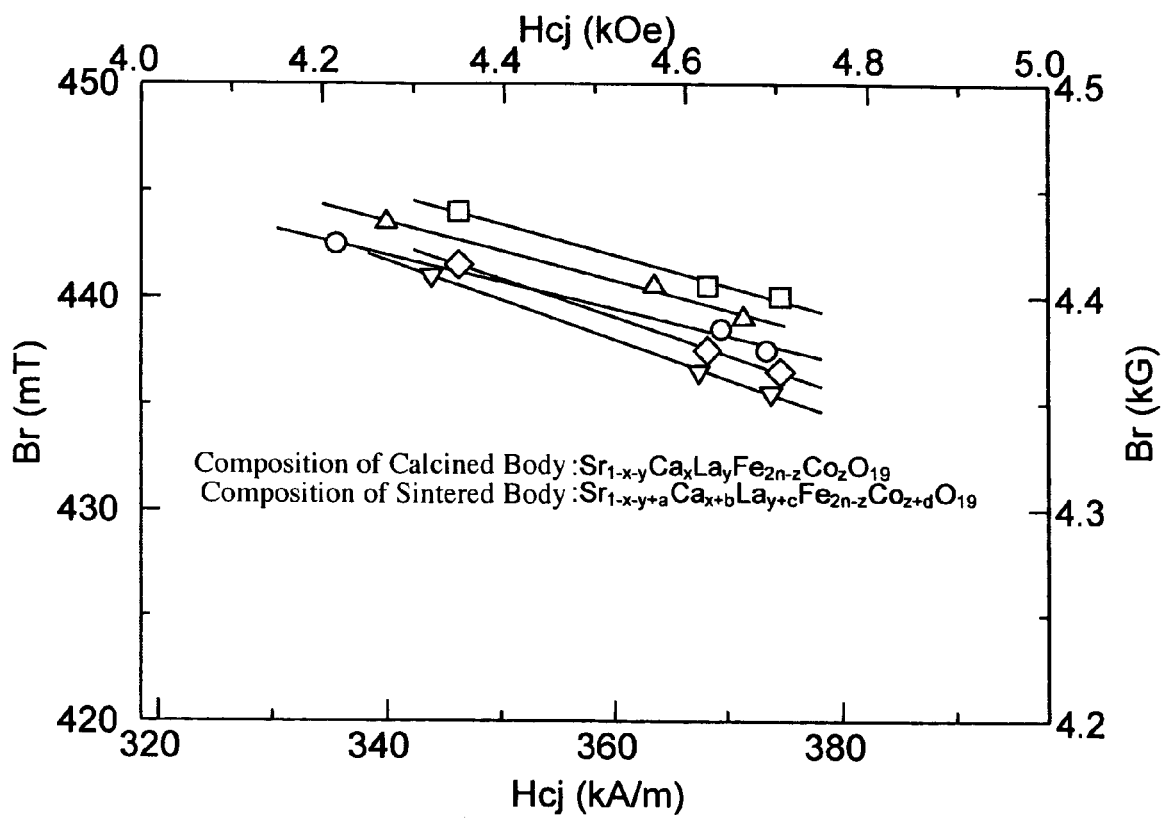
FIG. 16 is a graph showing a still further example of the magnetic properties of the sintered ferrite magnet of the present invention.

It is clear from FIG. 16 that the anisotropic sintered ferrite magnets of Example 15 (La: prior-added, Co: prior-added), Example 16 (La: prior-added, Co: prior/post-added), Example 17 (La: prior-added, Co: post-added), Example 18 (La: prior/post-added, Co: prior-added), and Example 19 (La: prior/post-added, Co: post-added) had magnetic properties equal to or higher than those of Examples 9, 14 shown in Table 27, and higher magnetic properties than those of Conventional Example 7 shown in Table 27.

Example 20

Investigation of Mixed Rare Earth (R=La, Ce, Pr, Nd) Starting Materials $SrCO_3$ powder, $CaCO_3$ powder, R material powder (blend of two of La oxide powder, Ce oxide powder, Pr oxide powder and Nd oxide powder), α-$Fe_2O_3$ powder and CoOOH powder were wet-mixed and calcined at 1523 K in the air, to produce calcined bodies having the basic compositions of Sample Nos. 161-163 shown in Table 32. In the wet-mixing step, 0.2 parts by mass of $SiO_2$ powder were added to 100 parts by mass of the mixture. Subsequently, dry coarse pulverization, wet fine pulverization, and molding and sintering in a magnetic field were conducted in the same manner as in Example 1. The magnetic properties of the resultant anisotropic sintered ferrite magnets were measured at room temperature. The results are plotted as Sample Nos. 161-163 in FIG. 17. The basic compositions of the calcined bodies and the sintered bodies are shown in the rows of Sample Nos. 161-163 in Tables 32 and 33.

TABLE 32

| No. | Sample No. | R | n | x | y | z |
|---|---|---|---|---|---|---|
| Example 20 | 161 | 50% La + 50% Ce | 5.8 | 0.10 | 0.34 | 0.24 |
|  | 162 | 50% La + 50% Pr | 5.8 | 0.10 | 0.34 | 0.24 |
|  | 163 | 50% La + 50% Nd | 5.8 | 0.10 | 0.34 | 0.24 |
| Conventional Example 7 | 113 | 100% La | 5.8 | 0 | 0.34 | 0.24 |
| Example 9 | 115 | 100% La | 5.8 | 0.10 | 0.34 | 0.24 |

| No. | Sample No. | $(1-x-y)/(1-y)$ | y/x | x/z | y/z |
|---|---|---|---|---|---|
| Example 20 | 161 | 0.85 | 3.4 | 0.42 | 1.4 |
|  | 162 | 0.85 | 3.4 | 0.42 | 1.4 |
|  | 163 | 0.85 | 3.4 | 0.42 | 1.4 |
| Conventional Example 7 | 113 | 1.0 | — | 0 | 1.4 |
| Example 9 | 115 | 0.85 | 3.4 | 0.42 | 1.4 |

TABLE 33

| No. | Sample No. | a | b | c | d | n' | x+b | y+c | z+d |
|---|---|---|---|---|---|---|---|---|---|
| Example 20 | 161 | 0.035 | 0.084 | 0 | 0 | 5.18 | 0.184 | 0.34 | 0.24 |
|  | 162 | 0.035 | 0.084 | 0 | 0 | 5.18 | 0.184 | 0.34 | 0.24 |
|  | 163 | 0.035 | 0.084 | 0 | 0 | 5.18 | 0.184 | 0.34 | 0.24 |

TABLE 33-continued

| | | | | | | | | | |
|---|---|---|---|---|---|---|---|---|---|
| Conventional Example 7 | 113 | 0.036 | 0.084 | 0 | 0 | 5.18 | 0.084 | 0.34 | 0.24 |
| Example 9 | 115 | 0.035 | 0.084 | 0 | 0 | 5.18 | 0.184 | 0.34 | 0.24 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Example 20 | 161 | 0.76 | 1.42 | 3.40 | 0.42 |
| | 162 | 0.76 | 1.42 | 3.40 | 0.42 |
| | 163 | 0.76 | 1.42 | 3.40 | 0.42 |
| Conventional Example 7 | 113 | 0.89 | 1.42 | — | 0 |
| Example 9 | 115 | 0.76 | 1.42 | 3.40 | 0.42 |

Figure 17:
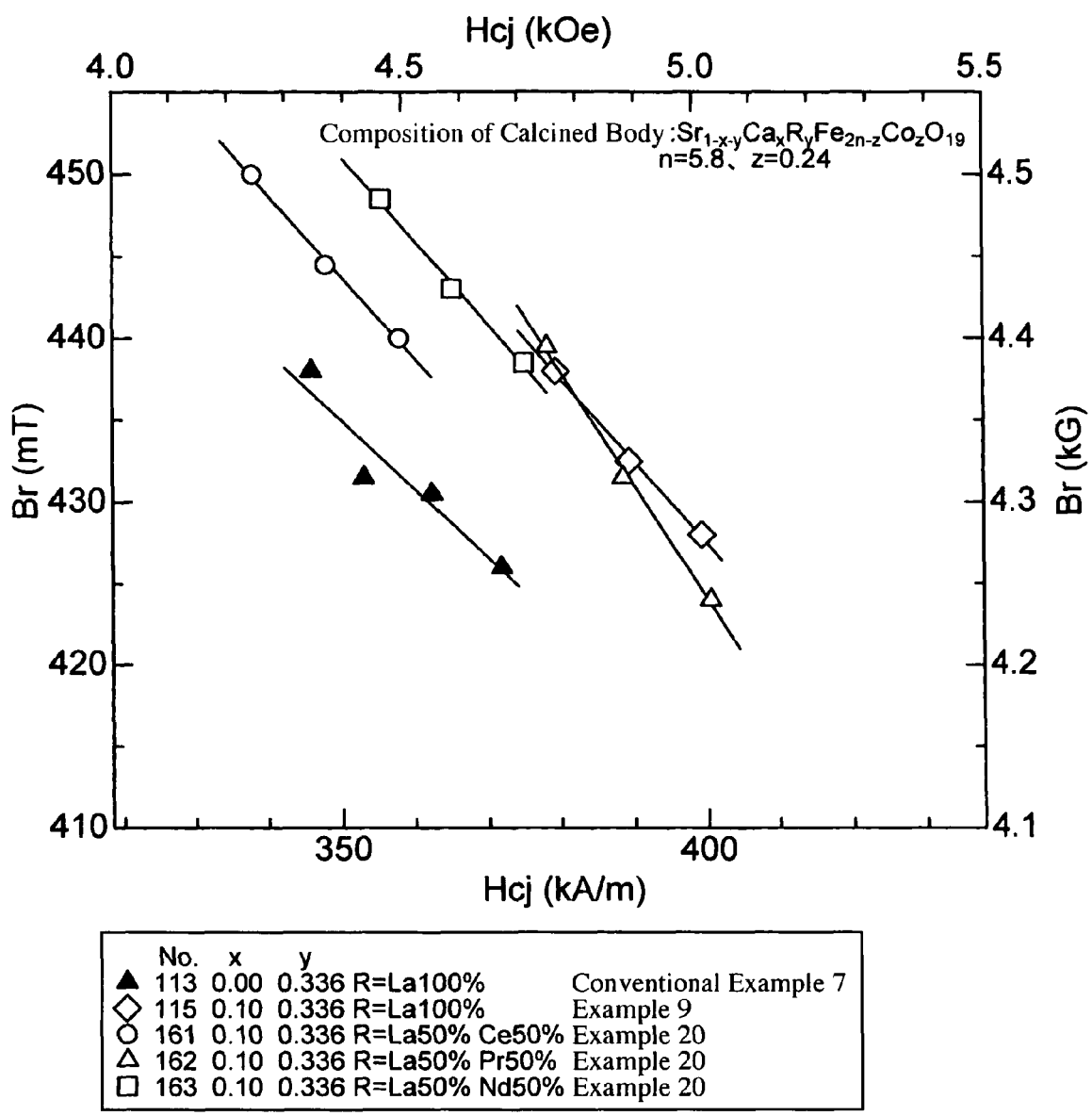
FIG. 17 is a graph showing a still further example of the magnetic properties of the sintered ferrite magnet of the present invention.

It is clear from FIG. 17 that the anisotropic sintered ferrite magnets of Example 20 (Sample Nos. 161-163) indispensably containing La as R had higher magnetic properties than those of Conventional Example 7 (Sample No. 113).

Example 21

Sintering in Oxygen

The same finely pulverized slurry as in Example 9 (Sample No. 115) was molded in a magnetic field. The resultant green bodies were sintered at 1483 K, 1493 K, 1498 K and 1503 K, respectively, for 2 hours in an oxygen atmosphere (oxygen partial pressure: 1.0 atm). The magnetic properties of the resultant anisotropic sintered ferrite magnets were measured at room temperature. The results are plotted as Sample No. 171 in FIG. 18. The basic compositions of the calcined body and the sintered body are shown in the row of Sample No. 171 in Tables 34 and 35.

TABLE 34

| No. | Sample No. | n | x | y | z | $(1-x-y)/(1-y)$ | $y/x$ | $x/z$ | $y/z$ |
|---|---|---|---|---|---|---|---|---|---|
| Example 21 | 171 | 5.8 | 0.10 | 0.34 | 0.24 | 0.85 | 3.4 | 0.42 | 1.4 |
| Conventional Example 7 | 113 | 5.8 | 0 | 0.34 | 0.24 | 1.0 | — | 0 | 1.4 |
| Example 9 | 115 | 5.8 | 0.10 | 0.34 | 0.24 | 0.85 | 3.4 | 0.42 | 1.4 |

TABLE 35

| No. | Sample No. | a | b | c | d | n' | x+b | y+c | z+d |
|---|---|---|---|---|---|---|---|---|---|
| Example 21 | 171 | 0.035 | 0.084 | 0 | 0 | 5.18 | 0.184 | 0.34 | 0.24 |
| Conventional Example 7 | 113 | 0.036 | 0.084 | 0 | 0 | 5.18 | 0.084 | 0.34 | 0.24 |
| Example 9 | 115 | 0.035 | 0.084 | 0 | 0 | 5.18 | 0.184 | 0.34 | 0.24 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Example 21 | 171 | 0.76 | 1.42 | 3.40 | 0.42 |
| Conventional Example 7 | 113 | 0.89 | 1.42 | — | 0 |
| Example 9 | 115 | 0.76 | 1.42 | 3.40 | 0.42 |

Figure 18:
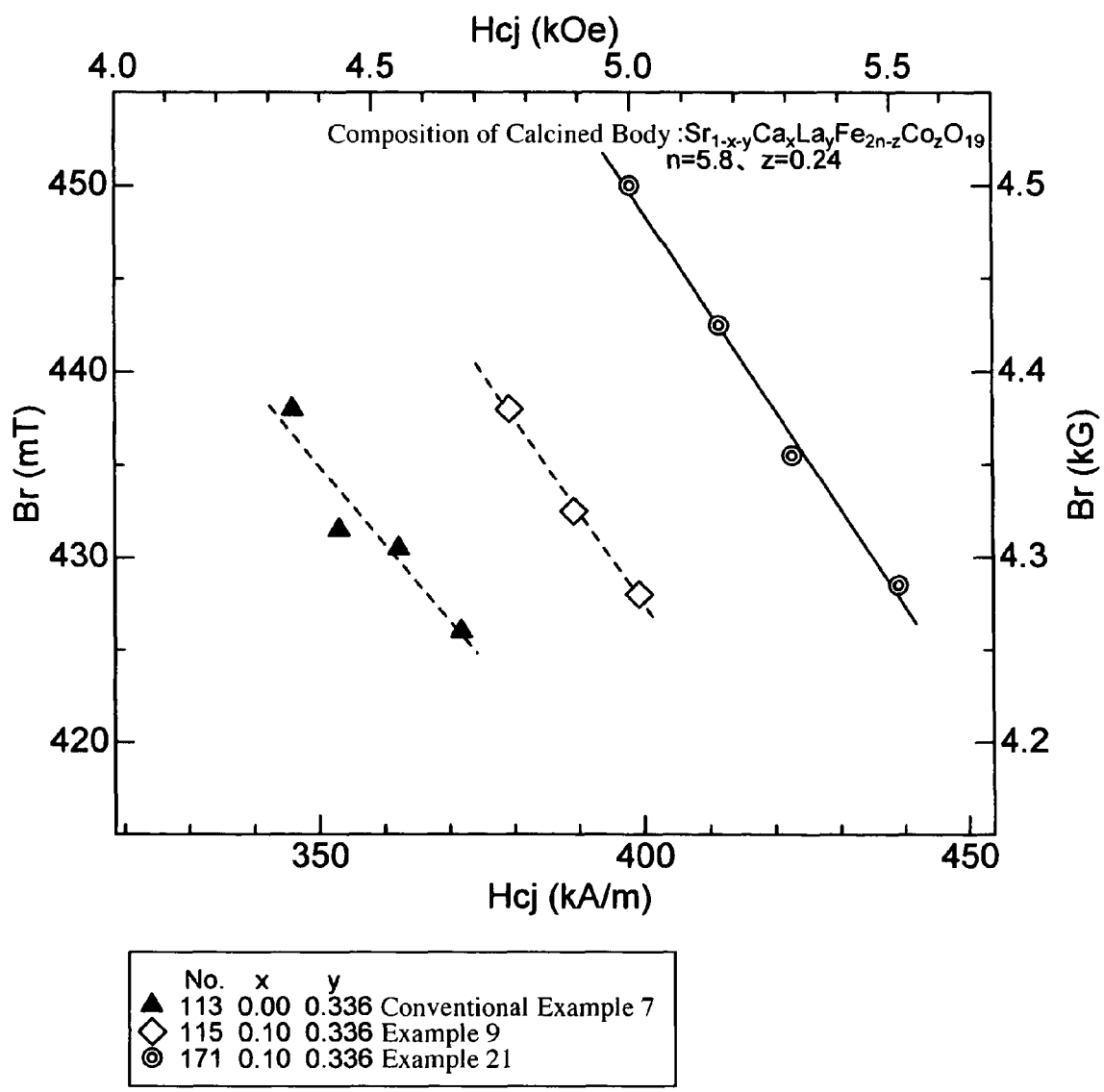
FIG. 18 is a graph showing a still further example of the magnetic properties of the sintered ferrite magnet of the present invention.

It is clear from FIG. 18 that the anisotropic sintered ferrite magnet of Example 21 (Sample No. 171) sintered in oxygen had extremely higher magnetic properties than those of Conventional Example 7 (Sample No. 113).

The X-ray diffraction measurement of typical calcined bodies and typical anisotropic sintered ferrite magnets among those of Examples 1-21 indicates that any of them was composed of an M phase alone.

Example 22

Anisotropic Sintered Ferrite Magnet Produced from Calcined Body Having M Phase as Main Phase $SrCO_3$ powder, $CaCO_3$ powder, La hydroxide powder, $\alpha\text{-}Fe_2O_3$ powder and CoOOH powder were wet-mixed and calcined at 1523 K in the air, to produce a calcined body having the basic composition of Sample No. 181 shown in Table 36. Incidentally, 0.2 parts by mass of $SiO_2$ powder was added to 100 parts by mass of the mixture in a wet-mixing step before calcining. In the X-ray diffraction of the resultant calcined body, a diffraction pattern of $\alpha\text{-}Fe_2O_3$ was observed in addition to the M phase (main phase). Subsequently, dry coarse pulverization, wet fine pulverization, and molding and sintering in a magnetic field were conducted in the same manner as in Example 1. The magnetic properties of the resultant anisotropic sintered ferrite magnet were measured at room temperature. The results are shown in Table 38. The basic compositions of the calcined body and the sintered body are shown in the row of Sample No. 181 in Tables 36 and 37.

TABLE 36

| No. | Sample No. | n | x | y | z | $(1-x-y)/(1-y)$ | $y/x$ | $x/z$ | $y/z$ |
|---|---|---|---|---|---|---|---|---|---|
| Example 22 | 181 | 6.6 | 0.12 | 0.38 | 0.27 | 0.81 | 3.2 | 0.44 | 1.4 |
| Example 9 | 115 | 5.8 | 0.10 | 0.34 | 0.24 | 0.85 | 3.4 | 0.42 | 1.4 |

TABLE 37

| No. | Sample No. | a | b | c | d | n' | x+b | y+c | z+d |
|---|---|---|---|---|---|---|---|---|---|
| Example 22 | 181 | 0.175 | 0.094 | 0 | 0 | 5.20 | 0.214 | 0.38 | 0.27 |
| Example 9 | 115 | 0.035 | 0.084 | 0 | 0 | 5.18 | 0.184 | 0.34 | 0.24 |

| No. | Sample No. | $(1-x-y+a)/(1-y+a+b)$ | $(y+c)/(z+d)$ | $(y+c)/x$ | $x/(z+d)$ |
|---|---|---|---|---|---|
| Example 22 | 181 | 0.76 | 1.41 | 3.17 | 0.44 |
| Example 9 | 115 | 0.76 | 1.42 | 3.40 | 0.42 |

TABLE 38

| No. | Sample No. | Br (mT) | Hcj (kA/m) |
|---|---|---|---|
| Example 22 | 181 | 431 | 389.1 |
| Example 9 | 115 | 433 | 389.9 |

The X-ray diffraction measurement reveals that the anisotropic sintered ferrite magnet of Example 22 had an M-type ferrite structure. Table 38 indicates that the anisotropic sintered ferrite magnet of Example 22 produced from a calcined body having M phase as a main phase had as high magnetic properties as those of the anisotropic sintered ferrite magnet of Example 9.

Table 39 indicates the analyzed compositions and basic compositions of main anisotropic sintered ferrite magnet samples used in the experiments. The analyzed composition of each anisotropic sintered ferrite is expressed with the total of metal elements constituting the magnet being 100 atomic %. The basic composition of each anisotropic sintered ferrite magnet is expressed by $x'$, $y'$, $z'$ and $n'$ in $(Sr, Ba)_{1-x'-y'}Ca_{x'}La_{y'}Fe_{2n'-z'}Co_{z'}O_{19}$. $x'$, $y'$, $z'$ and $n'$ represent the amounts of Ca, La and Co and a molar ratio in each anisotropic sintered ferrite magnet. The samples with asterisk (*) belong to Conventional Examples or Comparative Examples.

TABLE 39

Analyzed Compositions (atomic %) And Basic Compositions of Anisotropic Sintered Ferrite Magnets

| Sample No. | Ba | Sr | Ca | La | Fe | Mn | Co | Si | Al | Cr |
|---|---|---|---|---|---|---|---|---|---|---|
| 1* | 0.07 | 5.76 | 0.65 | 2.38 | 88.00 | 0.42 | 2.06 | 0.61 | 0.04 | 0.00 |
| 2 | 0.06 | 4.98 | 1.45 | 2.38 | 88.01 | 0.42 | 2.06 | 0.61 | 0.04 | 0.00 |
| 3 | 0.05 | 4.19 | 2.24 | 2.38 | 88.01 | 0.42 | 2.06 | 0.61 | 0.04 | 0.00 |
| 4 | 0.04 | 3.41 | 3.03 | 2.38 | 88.02 | 0.42 | 2.06 | 0.60 | 0.04 | 0.00 |
| 5* | 0.07 | 5.49 | 0.66 | 3.03 | 87.03 | 0.41 | 2.66 | 0.62 | 0.03 | 0.00 |
| 6 | 0.06 | 4.42 | 1.73 | 3.04 | 87.03 | 0.41 | 2.66 | 0.61 | 0.03 | 0.00 |
| 7 | 0.04 | 3.43 | 2.73 | 3.04 | 87.04 | 0.41 | 2.66 | 0.61 | 0.03 | 0.00 |
| 8* | 0.03 | 2.36 | 3.81 | 3.04 | 87.05 | 0.41 | 2.66 | 0.60 | 0.03 | 0.00 |
| 9* | 0.02 | 1.38 | 4.80 | 3.04 | 87.06 | 0.41 | 2.66 | 0.60 | 0.04 | 0.00 |
| 10* | 0.07 | 5.29 | 1.44 | 2.06 | 88.01 | 0.42 | 2.06 | 0.61 | 0.04 | 0.00 |
| 11 | 0.06 | 4.98 | 1.45 | 2.38 | 88.01 | 0.42 | 2.06 | 0.61 | 0.04 | 0.00 |
| 12 | 0.06 | 4.66 | 1.45 | 2.70 | 88.00 | 0.42 | 2.06 | 0.61 | 0.04 | 0.00 |
| 13 | 0.06 | 4.35 | 1.45 | 3.02 | 88.00 | 0.42 | 2.06 | 0.61 | 0.04 | 0.00 |
| 14 | 0.05 | 4.04 | 1.45 | 3.33 | 88.00 | 0.42 | 2.06 | 0.61 | 0.04 | 0.00 |
| 15 | 0.05 | 3.72 | 1.45 | 3.65 | 87.99 | 0.42 | 2.06 | 0.62 | 0.04 | 0.00 |
| 16* | 0.05 | 3.80 | 2.73 | 2.66 | 87.05 | 0.41 | 2.66 | 0.61 | 0.03 | 0.00 |
| 17 | 0.04 | 3.39 | 2.73 | 3.08 | 87.04 | 0.41 | 2.66 | 0.61 | 0.03 | 0.00 |
| 18 | 0.04 | 3.06 | 2.73 | 3.41 | 87.04 | 0.41 | 2.66 | 0.61 | 0.03 | 0.00 |
| 19 | 0.06 | 5.05 | 1.44 | 2.30 | 88.18 | 0.42 | 1.90 | 0.61 | 0.04 | 0.00 |
| 20 | 0.06 | 4.66 | 1.45 | 2.70 | 88.00 | 0.42 | 2.06 | 0.61 | 0.04 | 0.00 |
| 21 | 0.05 | 3.88 | 2.35 | 2.76 | 87.64 | 0.41 | 2.27 | 0.61 | 0.04 | 0.00 |
| 22 | 0.04 | 3.06 | 2.73 | 3.41 | 87.04 | 0.41 | 2.66 | 0.61 | 0.03 | 0.00 |
| 23* | 0.08 | 6.09 | 0.65 | 1.86 | 88.69 | 0.42 | 1.55 | 0.61 | 0.04 | 0.01 |
| 24* | 0.07 | 5.76 | 0.65 | 2.38 | 88.00 | 0.42 | 2.06 | 0.61 | 0.04 | 0.00 |
| 25* | 0.07 | 5.45 | 0.66 | 3.08 | 87.03 | 0.41 | 2.66 | 0.62 | 0.03 | 0.00 |
| 26* | 0.00 | 0.27 | 5.18 | 4.18 | 85.83 | 0.41 | 3.49 | 0.61 | 0.03 | 0.00 |
| 30* | 0.03 | 2.62 | 3.82 | 2.38 | 88.03 | 0.42 | 2.06 | 0.60 | 0.04 | 0.00 |
| 31* | 0.04 | 3.17 | 3.27 | 2.38 | 88.02 | 0.42 | 2.06 | 0.60 | 0.04 | 0.00 |
| 40* | 0.06 | 4.52 | 0.66 | 3.52 | 87.99 | 0.42 | 2.19 | 0.62 | 0.04 | 0.00 |
| 65* | 0.07 | 5.49 | 0.66 | 3.03 | 87.03 | 0.41 | 2.66 | 0.62 | 0.03 | 0.00 |
| 66 | 0.06 | 4.42 | 1.73 | 3.04 | 87.03 | 0.41 | 2.66 | 0.61 | 0.03 | 0.00 |
| 67 | 0.04 | 3.43 | 2.73 | 3.04 | 87.04 | 0.41 | 2.66 | 0.61 | 0.03 | 0.00 |
| 68* | 0.03 | 2.36 | 3.81 | 3.04 | 87.05 | 0.41 | 2.66 | 0.60 | 0.03 | 0.00 |
| 69* | 0.02 | 1.38 | 4.80 | 3.04 | 87.06 | 0.41 | 2.66 | 0.60 | 0.04 | 0.00 |

| Sample No. | $x'$ | $y'$ | $z'$ | $n'$ |
|---|---|---|---|---|
| 1* | 0.07 | 0.27 | 0.23 | 5.10 |
| 2 | 0.16 | 0.27 | 0.23 | 5.10 |
| 3 | 0.25 | 0.27 | 0.23 | 5.11 |
| 4 | 0.34 | 0.27 | 0.23 | 5.11 |
| 5* | 0.07 | 0.33 | 0.29 | 4.87 |
| 6 | 0.19 | 0.33 | 0.29 | 4.88 |
| 7 | 0.30 | 0.33 | 0.29 | 4.88 |
| 8* | 0.41 | 0.33 | 0.29 | 4.88 |
| 9* | 0.52 | 0.33 | 0.29 | 4.88 |
| 10* | 0.16 | 0.23 | 0.23 | 5.10 |
| 11 | 0.16 | 0.27 | 0.23 | 5.10 |
| 12 | 0.16 | 0.30 | 0.23 | 5.10 |
| 13 | 0.16 | 0.34 | 0.23 | 5.10 |
| 14 | 0.16 | 0.38 | 0.23 | 5.10 |
| 15 | 0.16 | 0.41 | 0.23 | 5.10 |
| 16* | 0.30 | 0.29 | 0.29 | 4.88 |
| 17 | 0.30 | 0.33 | 0.29 | 4.88 |
| 18 | 0.30 | 0.37 | 0.29 | 4.88 |
| 19 | 0.16 | 0.26 | 0.21 | 5.11 |
| 20 | 0.16 | 0.30 | 0.23 | 5.10 |
| 21 | 0.26 | 0.31 | 0.25 | 5.00 |
| 22 | 0.30 | 0.37 | 0.29 | 4.88 |
| 23* | 0.08 | 0.21 | 0.18 | 5.23 |
| 24* | 0.07 | 0.27 | 0.23 | 5.10 |
| 25* | 0.07 | 0.33 | 0.29 | 4.87 |
| 26* | 0.54 | 0.43 | 0.36 | 4.66 |
| 30* | 0.43 | 0.27 | 0.23 | 5.11 |
| 31* | 0.37 | 0.27 | 0.23 | 5.11 |

TABLE 39-continued

Analyzed Compositions (atomic %) And Basic Compositions of Anisotropic Sintered Ferrite Magnets

|  | Ca | Fe | Co | Al |
|---|---|---|---|---|
| 40* | 0.08 | 0.40 | 0.25 | 5.18 |
| 65* | 0.07 | 0.33 | 0.29 | 4.87 |
| 66 | 0.19 | 0.33 | 0.29 | 4.88 |
| 67 | 0.30 | 0.33 | 0.29 | 4.88 |
| 68* | 0.41 | 0.33 | 0.29 | 4.88 |
| 69* | 0.52 | 0.33 | 0.29 | 4.88 |

| Sample No. | Ba | Sr | Ca | La | Fe | Mn | Co | Si | Al | Cr |
|---|---|---|---|---|---|---|---|---|---|---|
| 101* | 0.08 | 6.14 | 0.65 | 1.88 | 88.63 | 0.42 | 1.56 | 0.61 | 0.04 | 0.00 |
| 102 | 0.07 | 5.75 | 1.04 | 1.88 | 88.63 | 0.42 | 1.56 | 0.61 | 0.04 | 0.00 |
| 103 | 0.07 | 5.36 | 1.43 | 1.88 | 88.63 | 0.42 | 1.56 | 0.61 | 0.04 | 0.01 |
| 104 | 0.06 | 4.98 | 1.82 | 1.88 | 88.63 | 0.42 | 1.56 | 0.61 | 0.04 | 0.01 |
| 105* | 0.07 | 5.83 | 0.65 | 2.19 | 88.63 | 0.42 | 1.56 | 0.61 | 0.04 | 0.00 |
| 106 | 0.07 | 5.44 | 1.04 | 2.19 | 88.63 | 0.42 | 1.56 | 0.61 | 0.04 | 0.00 |
| 107 | 0.06 | 5.06 | 1.43 | 2.19 | 88.63 | 0.42 | 1.56 | 0.61 | 0.04 | 0.00 |
| 108 | 0.06 | 4.67 | 1.82 | 2.19 | 88.64 | 0.42 | 1.56 | 0.61 | 0.04 | 0.00 |
| 109* | 0.07 | 5.75 | 0.65 | 2.27 | 88.32 | 0.42 | 1.88 | 0.61 | 0.04 | 0.00 |
| 110 | 0.07 | 5.37 | 1.04 | 2.27 | 88.32 | 0.42 | 1.88 | 0.61 | 0.04 | 0.00 |
| 111 | 0.06 | 4.98 | 1.43 | 2.27 | 88.32 | 0.42 | 1.88 | 0.61 | 0.04 | 0.00 |
| 112 | 0.06 | 4.59 | 1.82 | 2.27 | 88.32 | 0.42 | 1.88 | 0.61 | 0.04 | 0.00 |
| 113* | 0.07 | 5.37 | 0.66 | 2.66 | 88.31 | 0.42 | 1.88 | 0.61 | 0.04 | 0.00 |
| 114 | 0.06 | 4.98 | 1.04 | 2.66 | 88.31 | 0.42 | 1.88 | 0.61 | 0.04 | 0.00 |
| 115 | 0.06 | 4.59 | 1.43 | 2.66 | 88.32 | 0.42 | 1.88 | 0.61 | 0.04 | 0.00 |
| 116 | 0.05 | 4.21 | 1.82 | 2.66 | 88.32 | 0.42 | 1.88 | 0.61 | 0.04 | 0.00 |
| 117 | 0.05 | 4.21 | 1.44 | 3.05 | 88.00 | 0.42 | 2.19 | 0.61 | 0.04 | 0.00 |
| 118 | 0.05 | 3.82 | 1.82 | 3.05 | 88.01 | 0.42 | 2.19 | 0.61 | 0.04 | 0.00 |
| 119 | 0.04 | 3.44 | 2.21 | 3.05 | 88.01 | 0.42 | 2.19 | 0.61 | 0.04 | 0.00 |
| 120 | 0.05 | 3.75 | 1.44 | 3.52 | 88.00 | 0.42 | 2.19 | 0.61 | 0.04 | 0.00 |
| 121 | 0.04 | 3.36 | 1.83 | 3.52 | 88.00 | 0.42 | 2.19 | 0.61 | 0.04 | 0.00 |
| 122 | 0.04 | 2.97 | 2.22 | 3.52 | 88.00 | 0.42 | 2.19 | 0.61 | 0.04 | 0.00 |
| 123* | 0.08 | 6.45 | 0.65 | 1.64 | 88.56 | 0.42 | 1.57 | 0.60 | 0.04 | 0.00 |
| 124 | 0.08 | 5.99 | 1.03 | 1.72 | 88.56 | 0.42 | 1.57 | 0.60 | 0.04 | 0.00 |
| 125 | 0.07 | 5.53 | 1.04 | 2.19 | 88.24 | 0.42 | 1.88 | 0.61 | 0.04 | 0.00 |
| 126 | 0.06 | 4.84 | 1.42 | 2.50 | 88.24 | 0.42 | 1.88 | 0.61 | 0.04 | 0.00 |
| 127 | 0.08 | 5.98 | 1.04 | 1.64 | 88.71 | 0.42 | 1.48 | 0.61 | 0.04 | 0.00 |
| 128 | 0.07 | 5.86 | 1.04 | 1.81 | 88.65 | 0.42 | 1.49 | 0.61 | 0.04 | 0.00 |
| 129* | 0.07 | 5.89 | 1.04 | 1.78 | 88.60 | 0.42 | 1.55 | 0.61 | 0.04 | 0.00 |
| 130* | 0.07 | 5.88 | 1.04 | 1.79 | 88.66 | 0.42 | 1.50 | 0.61 | 0.04 | 0.00 |
| 131* | 0.08 | 6.41 | 0.65 | 1.65 | 88.65 | 0.42 | 1.49 | 0.61 | 0.04 | 0.00 |

| Sample No. | x' | y' | z' | n' |
|---|---|---|---|---|
| 101* | 0.07 | 0.21 | 0.18 | 5.19 |
| 102 | 0.12 | 0.21 | 0.18 | 5.19 |
| 103 | 0.16 | 0.21 | 0.18 | 5.19 |
| 104 | 0.21 | 0.21 | 0.18 | 5.19 |
| 105* | 0.07 | 0.25 | 0.18 | 5.18 |
| 106 | 0.12 | 0.25 | 0.18 | 5.19 |
| 107 | 0.16 | 0.25 | 0.18 | 5.19 |
| 108 | 0.21 | 0.25 | 0.18 | 5.19 |
| 109* | 0.07 | 0.26 | 0.21 | 5.18 |
| 110 | 0.12 | 0.26 | 0.21 | 5.18 |
| 111 | 0.16 | 0.26 | 0.21 | 5.19 |
| 112 | 0.21 | 0.26 | 0.21 | 5.19 |
| 113* | 0.07 | 0.30 | 0.21 | 5.18 |
| 114 | 0.12 | 0.30 | 0.21 | 5.18 |
| 115 | 0.16 | 0.30 | 0.21 | 5.18 |
| 116 | 0.21 | 0.30 | 0.21 | 5.19 |
| 117 | 0.16 | 0.35 | 0.25 | 5.18 |
| 118 | 0.21 | 0.35 | 0.25 | 5.18 |
| 119 | 0.25 | 0.35 | 0.25 | 5.19 |
| 120 | 0.16 | 0.40 | 0.25 | 5.18 |
| 121 | 0.21 | 0.40 | 0.25 | 5.18 |
| 122 | 0.25 | 0.40 | 0.25 | 5.18 |
| 123* | 0.07 | 0.19 | 0.18 | 5.14 |
| 124 | 0.12 | 0.19 | 0.18 | 5.14 |
| 125 | 0.12 | 0.25 | 0.21 | 5.14 |
| 126 | 0.16 | 0.28 | 0.21 | 5.14 |
| 127 | 0.12 | 0.19 | 0.17 | 5.19 |
| 128 | 0.12 | 0.21 | 0.17 | 5.15 |
| 129* | 0.12 | 0.20 | 0.18 | 5.16 |
| 130* | 0.12 | 0.20 | 0.17 | 5.16 |
| 131* | 0.07 | 0.19 | 0.17 | 5.15 |

EFFECT OF THE INVENTION

The present invention provides sintered ferrite magnets having such a high intrinsic coercivity Hcj as to prevent it from being demagnetized by a demagnetization field generated when it is made thin, while keeping a high residual magnetic flux density Br, and further having a high squareness ratio Hk/Hcj, if necessary.

What is claimed is:

1. A sintered ferrite magnet consisting essentially of an M phase, which comprises as indispensable elements: an A element, which is Sr or Sr and Ba; an R element, which is La or La plus at least one of rare earth elements including Y; Ca; Fe and Co, said magnet being produced through steps of pulverization, molding and sintering of a calcined oxide magnet material consisting essentially of an M phase and, having a basic composition represented by the following general formula (1):

$$A_{1-x-y}Ca_xR_yFe_{2n-z}Co_zO_{19} \text{ (atomic ratio)} \qquad (1),$$

wherein Ca is added in the form of a compound in an amount of x before calcining, and said sintered ferrite magnet having a basic composition represented by the following general formula (2):

$$A_{1-x-y+a}Ca_{x+b}R_{y+c}Fe_{2n-z}Co_{z+d}O_{19} \text{ (atomic ratio)} \qquad (2),$$

in the above general formulae (1) and (2), x, y, z and n representing the amounts of Ca, said R element and Co and a molar ratio in said oxide magnet material, and a, b, c and d representing the amounts of said A element, Ca, said R element and Co added to said calcined oxide magnet material in said pulverization, which are numerals meeting the following conditions:

$0.13 \leq x \leq 0.25$,
$0.1 \leq y \leq 0.6$,
$0.6 \leq [(1-x-y)/(1-y)] \leq 0.79$,
$0 \leq z \leq 0.4$,
$4 \leq n \leq 10$,
$0 \leq b \leq 0.2$,
$0.13 \leq x+b \leq 0.4$,
$0.1 \leq y+c \leq 0.6$,
$0.1 \leq z+d \leq 0.4$,
$0.56 \leq [(1-x-y+a)/(1-y+a+b)] \leq 0.72$,
$1.1 \leq (y+c)/(z+d) \leq 1.8$,
$1.0 \leq (y+c)/x \leq 20$, and
$0.1 \leq x/(z+d) \leq 1.2$.

2. The sintered ferrite magnet according to claim 1, wherein all of the R element and the Co are added in a mixing step before calcining.

3. The sintered ferrite magnet according to claim 1, wherein all of the R element and part of the Co are added in a mixing step before calcining, and the remainder of the Co is added in a pulverization step after calcining.

4. The sintered ferrite magnet according to claim 1, wherein all of the R element is added in a mixing step before calcining, and all of the Co is added in a pulverization step after calcining.

5. The sintered ferrite magnet according claim 1, wherein part of the R element and all of the Co are added in a mixing step before calcining, and the remainder of the R element is added in a pulverization step after calcining.

6. The sintered ferrite magnet according claim 1, wherein part of the R element and the Co are added in a mixing step before calcining, and the remainders of the R element and the Co are added in a pulverization step after calcining.

7. The sintered ferrite magnet according to claim 1, wherein part of the R element is added in a mixing step before calcining, and the remainder of the R element and all of the Co are added in a pulverization step after calcining.

* * * * *

UNITED STATES PATENT AND TRADEMARK OFFICE
CERTIFICATE OF CORRECTION

PATENT NO. : 7,906,036 B2  
APPLICATION NO. : 10/571354  
DATED : March 15, 2011  
INVENTOR(S) : Takashi Takami and Yasunobu Ogata Page 1 of 1

It is certified that error appears in the above-identified patent and that said Letters Patent is hereby corrected as shown below:

Title Page, Item (73) Assignee: please delete "NEOMAX Co., Ltd., Osaka (JP)" and insert --Hitachi Metals, Ltd., Tokyo (JP)--

Signed and Sealed this  
Twenty-third Day of August, 2011

David J. Kappos  
*Director of the United States Patent and Trademark Office*